(12) United States Patent
Maier et al.

(10) Patent No.: US 7,459,505 B2
(45) Date of Patent: Dec. 2, 2008

(54) BLOCK COPOLYMERS WITH ACIDIC GROUPS

(75) Inventors: Gerhard Maier, Munich (DE); Markus Gross, Kaufbeuren (DE); Hans-Georg Herz, Marktoberdorf (DE)

(73) Assignee: General Motors Corporation, Detroit, MI (US)

( * ) Notice: Subject to any disclaimer, the term of this patent is extended or adjusted under 35 U.S.C. 154(b) by 432 days.

(21) Appl. No.: 11/120,790

(22) Filed: May 3, 2005

(65) Prior Publication Data

US 2006/0251969 A1 Nov. 9, 2006

(51) Int. Cl.
*C08F 283/00* (2006.01)

(52) U.S. Cl. .......................... 525/535; 524/68; 521/27; 429/303

(58) Field of Classification Search ................... 521/27; 525/535; 429/303; 524/68
See application file for complete search history.

(56) References Cited

U.S. PATENT DOCUMENTS

| | | | |
|---|---|---|---|
| 4,331,746 A | 5/1982 | Sheibley | |
| 5,468,574 A | 11/1995 | Ehrenberg et al. | |
| 5,677,074 A | 10/1997 | Sperico et al. | |
| 6,579,948 B1 | 6/2003 | Tan et al. | |
| 6,630,265 B1 | 10/2003 | Taft, III et al. | |
| 6,761,989 B2 | 7/2004 | Terahura et al. | |
| 2001/0041279 A1 | 11/2001 | Terahara | |
| 2002/0155333 A1 | 10/2002 | Fitts et al. | |
| 2002/0160271 A1 | 10/2002 | Frech et al. | |
| 2002/0187377 A1 | 12/2002 | Shinoda et al. | |
| 2003/0013817 A1 | 1/2003 | Lu | |
| 2003/0031911 A1 | 2/2003 | Ritts et al. | |
| 2003/0044669 A1* | 3/2003 | Hidaka et al. | 429/33 |
| 2003/0049511 A1 | 3/2003 | Ritts et al. | |
| 2003/0104280 A1 | 6/2003 | Venkatesan et al. | |
| 2003/0198858 A1 | 10/2003 | Sun et al. | |
| 2003/0219640 A1 | 11/2003 | Nam et al. | |
| 2003/0222048 A1 | 12/2003 | Asakawa et al. | |
| 2004/0005474 A1 | 1/2004 | Charnock et al. | |
| 2004/0005490 A1 | 1/2004 | Fan et al. | |
| 2004/0038107 A1 | 2/2004 | Fan et al. | |
| 2004/0050816 A1 | 3/2004 | Asakawa et al. | |
| 2004/0101730 A1 | 5/2004 | Hirano et al. | |
| 2004/0126666 A1 | 7/2004 | Cao et al. | |
| 2004/0138387 A1 | 7/2004 | Terahara et al. | |
| 2004/0186262 A1 | 9/2004 | Maier et al. | |
| 2004/0202908 A1 | 10/2004 | Schmitz et al. | |

FOREIGN PATENT DOCUMENTS

| | | |
|---|---|---|
| CA | 2 393 241 A1 | 1/2003 |
| CA | 2 415 355 A1 | 1/2003 |
| CA | 2 470 123 A1 | 6/2003 |
| CA | 2 470 125 A1 | 6/2003 |
| DE | 103 26 703 A1 | 2/2004 |
| EP | 1 113 517 A2 | 7/2001 |
| EP | 1 274 142 A2 | 1/2003 |
| EP | 1 274 147 A2 | 1/2003 |
| EP | 1 431 281 A1 | 6/2004 |
| FR | 2 811 323 A1 | 7/2000 |
| FR | 2843398 A1 | 2/2004 |
| GB | 1 035 242 | 7/1966 |
| GB | 2 395 952 A | 6/2004 |
| JP | 08020704 | 1/1996 |
| WO | WO 97/50143 A1 | 12/1997 |
| WO | WO 00/05774 A1 | 2/2000 |
| WO | WO 01/19896 A1 | 3/2001 |
| WO | WO 01/70858 A2 | 9/2001 |
| WO | WO 02/05370 A1 | 1/2002 |
| WO | WO 02/087001 A2 | 10/2002 |
| WO | WO 03/030289 A2 | 4/2003 |
| WO | WO 03/050897 A2 | 6/2003 |
| WO | WO 03/054995 A1 | 7/2003 |
| WO | WO 03/097718 A1 | 11/2003 |
| WO | WO 03/097719 A1 | 11/2003 |
| WO | WO 2004/035662 A1 | 4/2004 |
| WO | 2005082964 A1 | 9/2005 |

OTHER PUBLICATIONS

Feng Wang, Taianlu Chen, Jiping Xy, "Sodium Sulfonate-Functional Poly(ether ketone)s", Macromol, Chem Phys. 199, 1421-1426 (1998).
Mokrini, A; Huneault, M.A., Proton Exchange Membranes Based on PVDF/SEBS Blends, Journal of Power Sources 152 (2006) 51-58.

* cited by examiner

*Primary Examiner*—Mark Eashoo
*Assistant Examiner*—Megan Arnberg

(57) ABSTRACT

Block copolymer that can be formed into an ion-conductive membrane are provided. The block copolymer of the invention includes a first polymer block and a second polymer block attached to the first polymer block. The first polymer block has a main polymer chain and one or more side chains extending from the main polymer chain. The one or more side chains include at least one substituent for proton transfer. Block copolymers utilizing phosphoric acid groups are also provided.

21 Claims, 1 Drawing Sheet

BLOCK COPOLYMERS WITH ACIDIC GROUPS

BACKGROUND OF THE INVENTION

1. Field of the Invention

The present invention relates to block copolymers that can be formed into ion conductive membranes for fuel cell applications.

2. Background Art

Fuel cells are used as an electrical power source in many applications. In particular, fuel cells are proposed for use in automobiles to replace internal combustion engines. In proton exchange membrane ("PEM") type fuel cells, hydrogen is supplied to the anode of the fuel cell and oxygen is supplied as the oxidant to the cathode. The oxygen can be either in a pure form ($O_2$) or air (a mixture of $O_2$ and $N_2$). PEM fuel cells typically have a membrane electrode assembly ("MEA") in which a solid polymer membrane has an anode catalyst on one face and a cathode catalyst on the opposite face.

The MEA, in turn, is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

In order to efficiently produce electricity, the polymer electrolyte membrane of a PEM fuel cell typically, must be thin, chemically stable, proton transmissive, non-electrically conductive, and gas impermeable. Moreover, during operation of the fuel cell, the PEM is exposed to rather severe conditions, which include, hydrolysis, oxidation and reduction (hydrogenation) that can lead to degradation of the polymer thereby reducing the lifetime of a polymer electrolyte membrane. The combination of these requirements imposes rather strict limitations on material choices for these membranes. Presently, there are relatively few polymer systems that provide even marginally acceptable results for the combination of these requirements. An example of a PEM is the Nafion membrane developed by DuPont in 1966 as a proton conductive membrane. This membrane is possibly the only advanced polymer electrolyte currently available for use in a membrane electrode assembly in a fuel cell.

Other polymer systems that may be used in PEM applications are found in U.S. Pat. No. 4,625,000 (the '000 patent), U.S. Pat. No. 6,090,895 (the '895 patent), and EP Patent No. 1,113,517 A2 (the '517 patent). The '000 discloses a sulfonation procedure forming poly(ether sulfone)s that may be used in solid polymer electrolyte application. However, the '000 patent's post-sulfonation of preformed polymers offers little control of the position, number, and distribution of the sulfonic acid groups along the polymer backbone. Moreover, the water uptake of membranes prepared from post sulfonated polymers increases, leading to large dimensional changes as well as a reduction in strength as the degree of sulfonation increases.

The '895 patent discloses a process for making cross linked acidic polymers of sulfonated poly(ether ketone)s, sulfonated poly(ether sulfone)s, sulfonated polystyrenes, and other acidic polymers by cross linking with a species which generates an acidic functionality. However, this reference does not suggest an effective way to cast membranes from those cross linked sulfo-pendent aromatic polyethers.

The '517 patent discloses a polymer electrolyte containing a block copolymer comprising blocks having sulfonic acid groups and blocks having no sulfonic acid groups formed by post sulfonation of precursor block copolymers consisting of aliphatic and aromatic blocks. In this patent, the precursor block copolymers are sulfonated using concentrated sulfuric acid, which leads to the sulfonation of aromatic blocks. However, once again, this post sulfonation of aromatic blocks offers the little control of the position, number, and distribution of the sulfonic acid groups along the polymer backbone. Furthermore, this post sulfonation of precursor block copolymers also leads to the cleavage of chemical bonds of the aliphatic block.

Although some of the proton conducting membranes of the prior art function adequately in hydrogen fuel cells, these membranes tend to require high humidity (up to 100% relative humidity) for efficient long-term operation. Moreover, prior art membranes are not able to efficiently operate at temperatures above 80° C. for extended periods of time. This temperature limitation necessitates that these membranes be constantly cooled and that the fuel (i.e., hydrogen) and oxidant be humidified.

Accordingly, there exists a need for improved materials for forming polymer electrolyte membranes and for methods of forming such materials.

SUMMARY OF THE INVENTION

The present invention overcomes the problems encountered in the prior art by providing in one embodiment a block copolymer that can be formed into an ion-conductive membrane. The block copolymer of this embodiment is characterized by having alternating hydrophobic and hydrophilic polymer blocks. Specifically, the block copolymer of this embodiment includes a first polymer block (i.e., a hydrophobic polymer block) and a second polymer block (i.e., a hydrophilic polymer block) attached to the first polymer block. The first polymer block has a main polymer chain and one or more side chains extending from the main polymer chain (i.e., spacers). The one or more side chains include at least one substituent for proton transfer. Typically, the substituent for proton transfer is an acid group or a salt of an acid group. The presence of these acidic groups on spacers within the hydrophilic segments allows the acidic groups to arrange themselves in orientations suitable for proton dissociation at low water levels through neighbour-group interactions.

In another embodiment of the invention, an ion conducting membrane incorporating the block copolymers of the invention is provided. The ion conducting membrane is advantageously useable in a fuel cell, and in at least one embodiment, a hydrogen fuel cell, operating continuously at temperatures up to about 120° C. Membranes formed from the block copolymers of the invention are characterized by having a microphase separated morphology due to the alternating hydrophobic and hydrophilic polymer sequences. Moreover, the ion conducting membranes of this embodiment have higher proton conductivities at low relative humidities than random copolymers of similar composition.

DETAILED DESCRIPTION OF THE PREFERRED EMBODIMENT(S)

Figure 1:
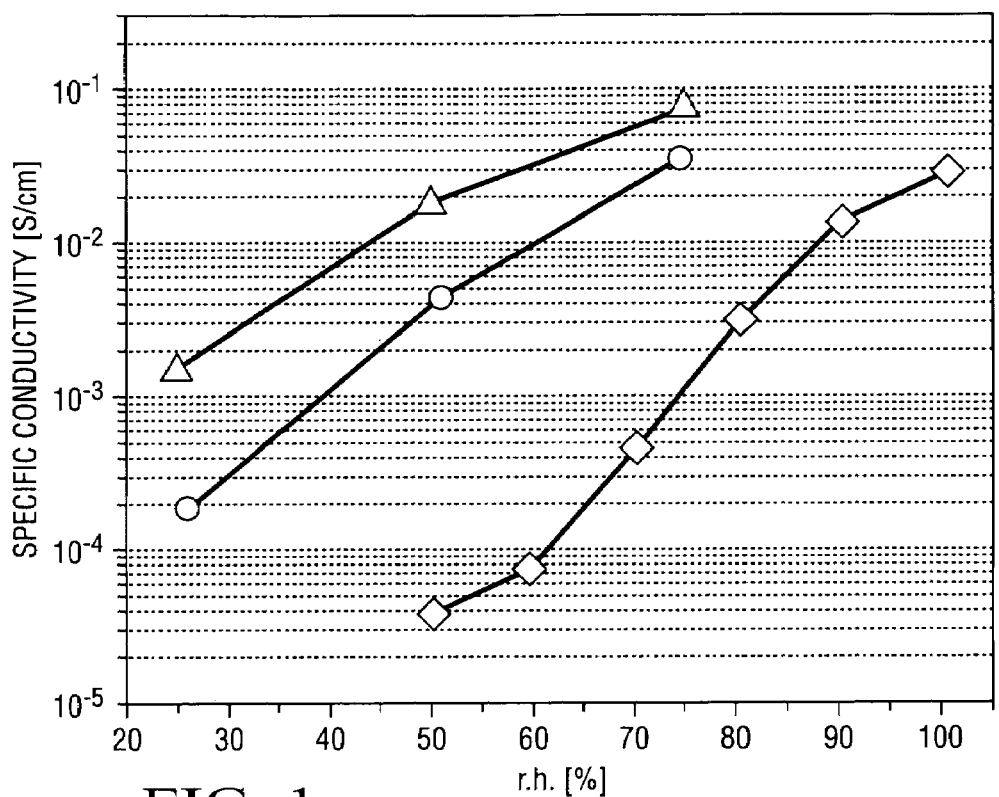
FIG. 1 provides plots that compare specific conductivities vs. relative humidity at 80° C.: diamonds correspond to block (sulfonated poly(ether sulfone) block copolymers with sulfonation on the main chain (Example 1 with an IEC=1.8); circles correspond to a block copolymer with sulfonation on the side chain (Example 2 having an IEC=1.7); and triangles correspond to a block copolymer with sulfonation on the main chain and side chains (Example 3 having an IEC=2.5)

Reference will now be made in detail to presently preferred compositions or embodiments and methods of the invention, which constitute the best modes of practicing the invention presently known to the inventors.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprise constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

In one embodiment, the present invention provides a block copolymer that can be formed into an ion-conductive membrane. In particular, block copolymers of the invention are particularly useful for forming ion conductive membranes to be used in PEM fuel cells. The block copolymers of the invention are characterized by having a sequence of alternating hydrophobic and hydrophilic blocks. These alternating segments are immiscible thereby inducing a microphase separated morphology in films cast from these materials. The block copolymer of the invention includes a first polymer block and a second polymer block attached to the first polymer block. The first polymer block has a main polymer chain and one or more side chains (i.e., spacers) extending from the main polymer chain. Each of the one or more side chains include at least one substituent for proton transfer.

In an embodiment of the invention, a block copolymer for use as a solid polymer electrolyte is provided. The block copolymer of this embodiment comprises a polymer having formula 1:

$$(A_m B_n)_p \qquad 1$$

wherein

A is a first polymer segment that is repeated m times to form first polymer block $A_m$;

B is a second polymer segment that is repeated n times to form second polymer block $B_n$, and m, n, p are each independently an integer.

Significantly, the second polymer segment has a main polymer chain and one or more side chains extending from the main polymer chain. Each of the side chains includes at least one substituent for proton transfer. First polymer block $A_m$ is bonded to second polymer block $B_n$. It has been discovered that the block copolymer of this embodiment is formable into an ion-conductive membrane that is useful for fuel cell applications, and in particular, for fuel cells operating at temperatures as high as 120° C. In a particularly useful variation, m, n are each independently an integer from 1 to 200 and p is an integer from 1 to 20.

Second polymer segment B includes at least one substituent for proton transfer. In a variation of this embodiment, such substituents for proton transfer include acidic substituents and salts thereof. Salts in this context are salts of the conjugate bases to an acidic substituent. Examples of suitable substituents for proton transfer are sulfonic and phosphonic acid groups and salts thereof which include, but are not limited to, $-SO_3H$, $-SO_3^-M^+$, $-COOH$, $-COO^-M^+$, $-PO_3H_2$, $-PO_3H^-M^+$, $-PO_3^{2-}M_2^+$, $-PO_3^{2-}M^{2+}$, and combinations thereof. In these examples, M is a metal such as an alkali or alkaline-earth metal, ammonium, or alkylammonium. Particularly useful metals are sodium, potassium, lithium, and the like.

In a variation of the invention, the first block Am has a molecular weight from about $5\times10^2$ to about $5\times10^5$ (g/mol) and the second polymer block $B_n$ has a molecular weight from about $5\times10^2$ to about $5\times10^5$ (g/mol). Moreover, the present embodiment is further characterized in that the first polymer block $A_n$ is hydrophobic and the second polymer block $B_n$ is hydrophilic. For example, when $B_n$ is hydrophilic, B described by formula 2:

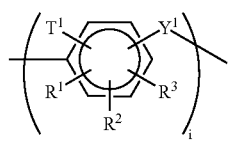

wherein:

$Y^1$ is $-O-$, $-S-$, $-CO-$, $-SO_2-$, $-C(CH_3)_2-$, $-C(CF_3)_2-$, $-P(O)(T^1)-$, $-C(CH_3)(T^1)-$, $-P(O)(R^4)-$, diphenyl methylene, diphenyl silicon, fluorenyl, an alkylene, a bond directly to the next aromatic ring, or

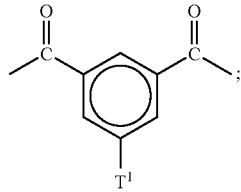

$R^1$, $R^2$, and $R^3$ are each independently H, $C_{1-10}$ alkyl, $C_{6-18}$ aryl, $C_{6-18}$ aralkyl, $SO_3H$, $-SO_3^-M^+$, $-COOH$, $-COO^-M^+$, $-PO_3H_2$, $-PO_3H^-M_+$, or $-PO_3^{2-}M_2^+$, $-PO_3^{2-}M^{2+}$;

$R^4$ is H, $C_{1-10}$ alkyl, $C_{6-18}$ aryl, or $C_{6-18}$ aralkyl;

$T^1$ is H or a moiety having at least one substituent for proton transfer including for example formula 3 set forth below; and i is an integer from 1 to 6.

The polymer segment having formula 2 is further limited with the proviso that when i>1, the $Y^1$ between sequential aromatic rings are the same or different; the $T^1$ on sequential aromatic rings are the same or different; the $R^1$, $R^2$, and $R^3$ on sequential aromatic rings are the same or different; and $T^1$ is a moiety having at least one substituent for proton transfer for at least one aromatic ring in B. Suitable substituents for proton transfer include $SO_3H$, $-SO_3^-M^+$, $-COOH$, $-COO^-M^+$, $-PO_3H_2$, $-PO_3H^-M^+$, or $-PO_3^{2-}M_2^+$, $-PO_3^{2-}M^{2+}$ as defined above. The presence of a phosphonic acid group or related salt (i.e., $-PO_3H_2$, $-PO_3H^-M^+$, $-PO_3^{2-}M_2^+$, or $-PO_3^{2-}M^{2+}$) is particularly useful in $T^1$ or in $R^1$, $R^2$, and $R^3$. Since phosphonic acid is a dibasic acid with a weakly dissociating second acid group, an alternative mechanism for proton transport, which is not possible in monobasic acids such as sulfonic acid, is available. Moreover, this mechanism is expected to operate even at low water contents than when monobasic acids are used. Accordingly, such polymers exhibit higher proton conductivity at lower humidity and water content than polymers of similar structure with sulfonic acid groups. Although the beneficial effects of using phosphonic acid groups are not limited to any particular mechanism, the proton transport mechanism in the presence of phosphonic acid groups is believed to be a Grotthus mechanism that operates through chains of hydrogen bonds thereby requiring a non-dissociated group. In a variation of this embodiment, at least one of $R^1$, $R^2$, and $R^3$ is —$PO_3H_2$, —$PO_3H^-M^+$, —$PO_3^{2-}M_2^+$, or —$PO_3^{2-}M^{2+}$.

In a particularly useful variation of this embodiment, $T^1$ is described by formula 3:

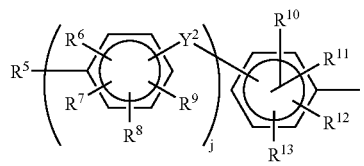

3 wherein:
$Y^2$ is —O—, —S—, —CO—, —$SO_2$—, —$C(CH_3)_2$—, —$C(CF_3)_2$—, —$P(O)(R^4)$—, diphenyl methylene, diphenyl silicon, fluorenyl, an alkylene, or a bond directly to the next aromatic ring;

$R^4$ is H, $C_{1-10}$ alkyl, $C_{6-18}$ aryl, or $C_{6-18}$ aralkyl;

$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, $SO_3H$, —$SO_3^-M^+$, —COOH, —$COO^-M^+$, —$PO_3H_2$, —$PO_3H^-M^+$, —$PO_3^{2-}M_2^+$, or —$PO_3^{2-}M^{2+}$;

M is a metal, ammonium, or alkylamonium; and j is an integer from 1 to 30.

The spacer having formula 3 is further limited by the proviso that when j>1, the $Y^2$ between sequential aromatic rings are the same or different; the $R^5$, $R^6$, $R^7$, $R^8$, and $R^9$ on sequential aromatic rings are the same or different; and at least one of $R^5$, $R^6$, $R^7$, $R^8$, $R^9$, $R^{10}$, $R^{11}$, $R^{12}$, and $R^{13}$ is —$SO_3H$, —$SO_3^-M^+$, —COOH, —$COO^-M^+$, —$PO_3H_2$, —$PO_3H^-M^+$, —$PO_3^{2-}M_2^+$, or —$PO_3^{2-}M^{2+}$.

Similarly, examples of hydrophobic polymer segment A are described by formula 4:

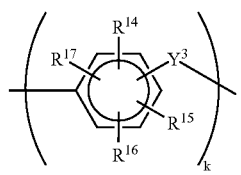

4 wherein:
$Y^3$ is —O—, —S—, —CO—, —$SO_2$—, —$C(CH_3)_2$—, —$C(CF_3)_2$—, —$P(O)(T^1)$—, —$C(CH_3)(T^1)$—, —$P(O)(R^4)$—, diphenyl methylene, diphenyl silicon, fluorenyl, an alkylene, a bond directly to the next aromatic ring, or

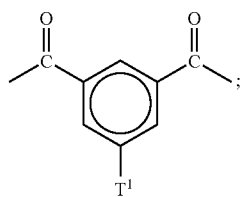

$R^4$ is H, $C_{1-10}$ alkyl, $C_{6-18}$ aryl, or $C_{6-18}$ aralkyl;

$T^1$ is H or a moiety having at least on substituent for proton transfer as set forth above; and $R^{14}$, $R^{15}$, $R^{16}$, and $R^{17}$ are each independently H, $C_{1-18}$ alkyl, $C_{6-18}$ aryl, or $C_{6-18}$ aralkyl;

k is an integer from 1 to 6.

Polymer segment having formula 4 is further limited by the proviso that when k>1, the $Y^3$ between sequential aromatic rings are the same or different and the $R^{14}$, $R^{15}$, $R^{16}$, and $R^{17}$ on sequential aromatic rings are the same or different.

As set forth above, formula 2 provides examples of hydrophilic blocks. Specific examples when B is hydrophilic are given by formulae 5 through 12 and salts thereof:

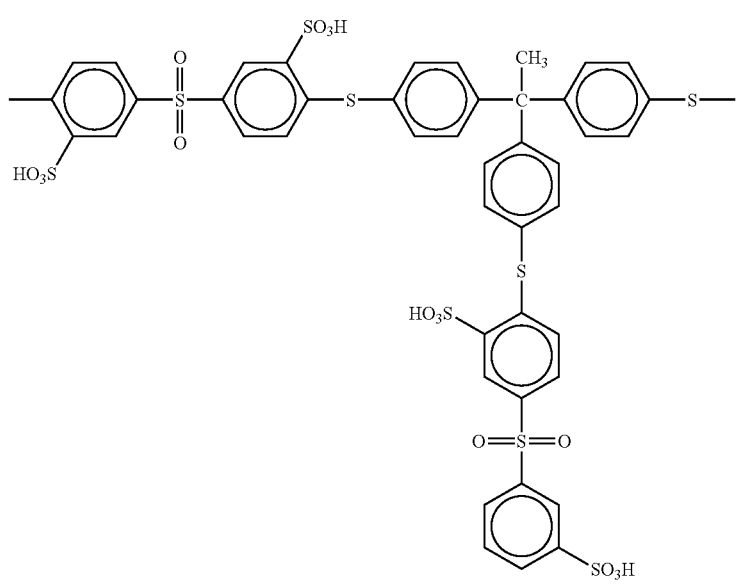

5

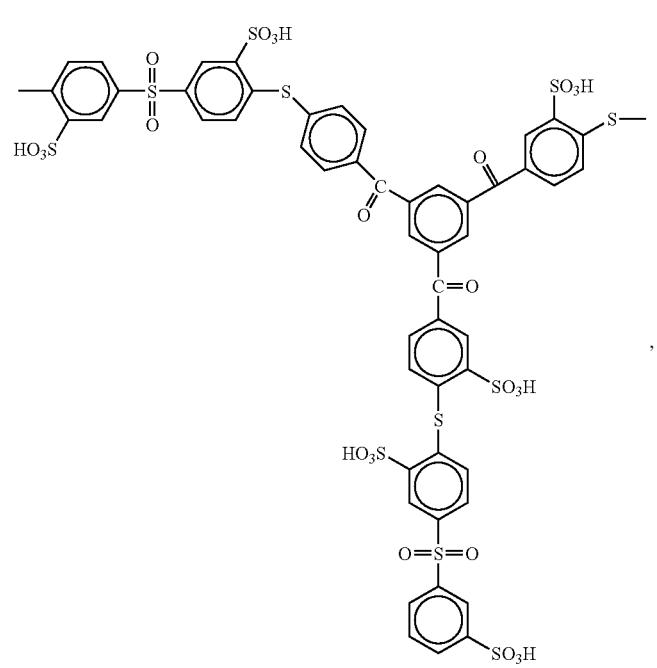
6
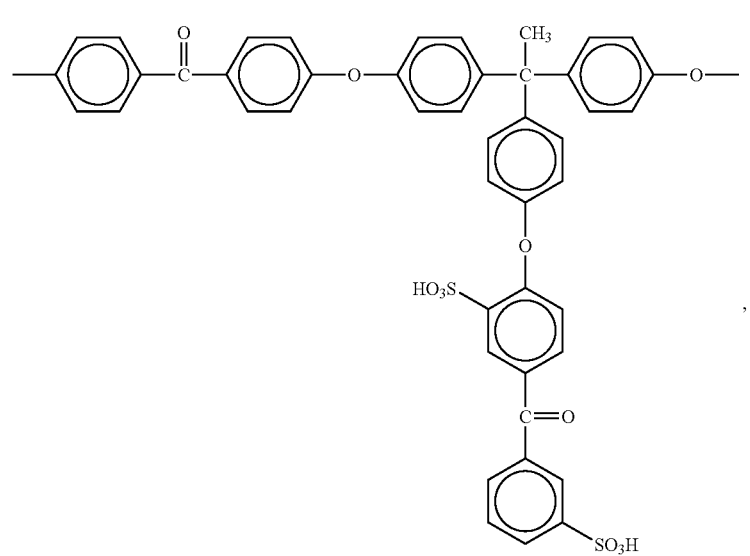
7

-continued
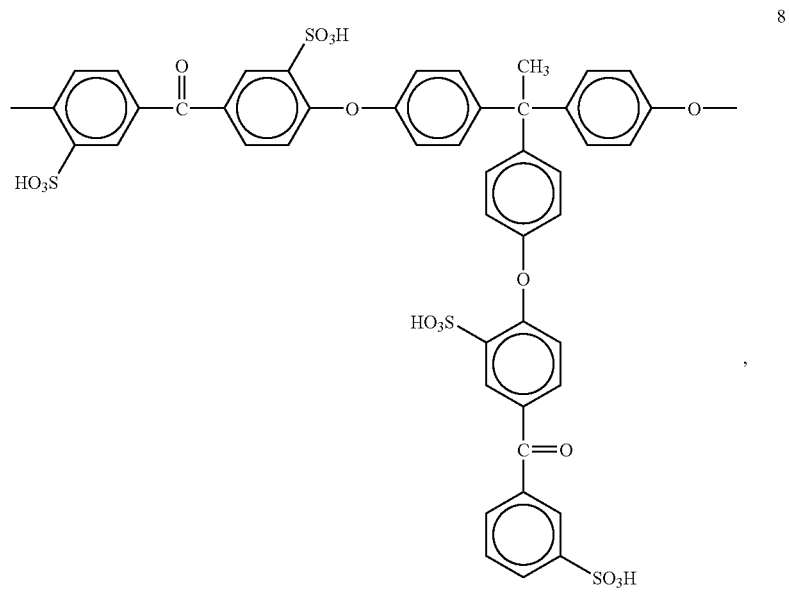
,
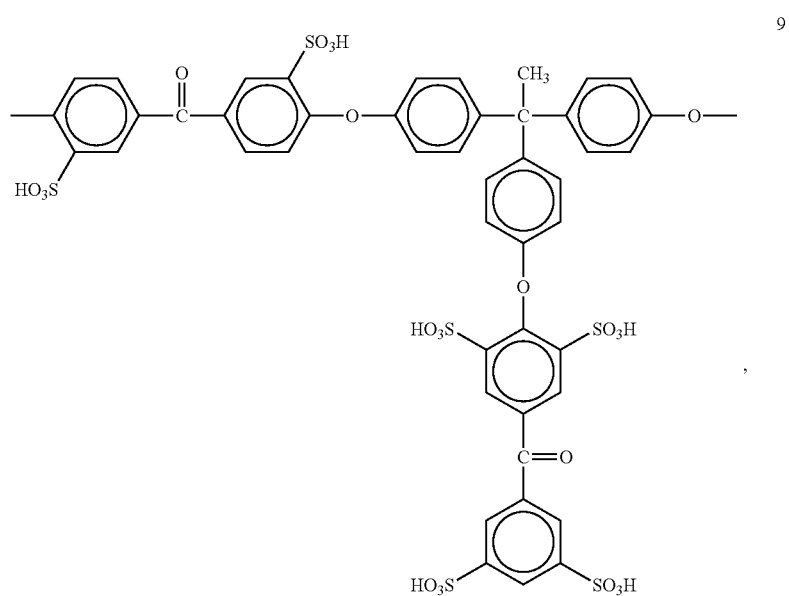
,

-continued
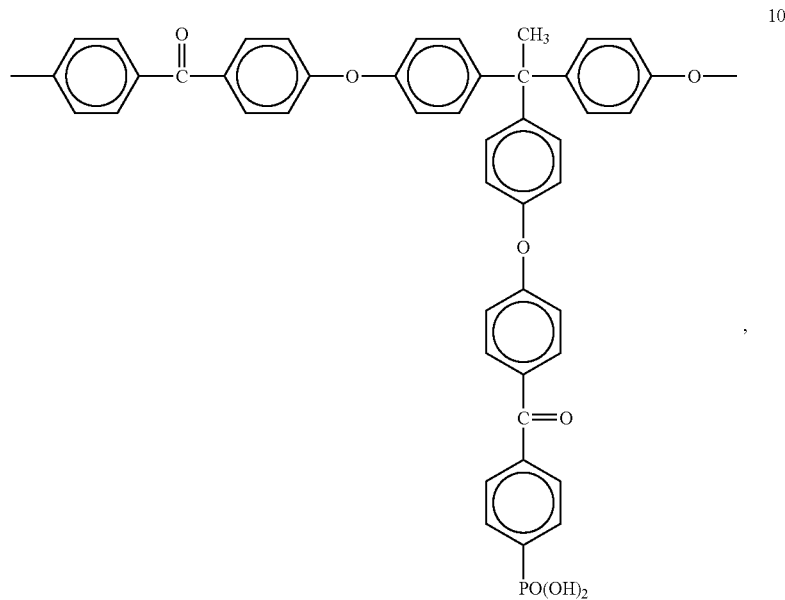
,
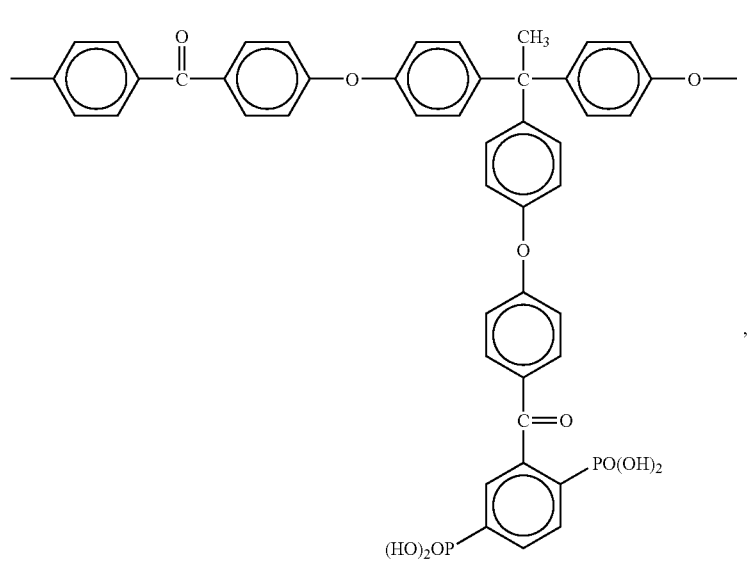
, and

-continued
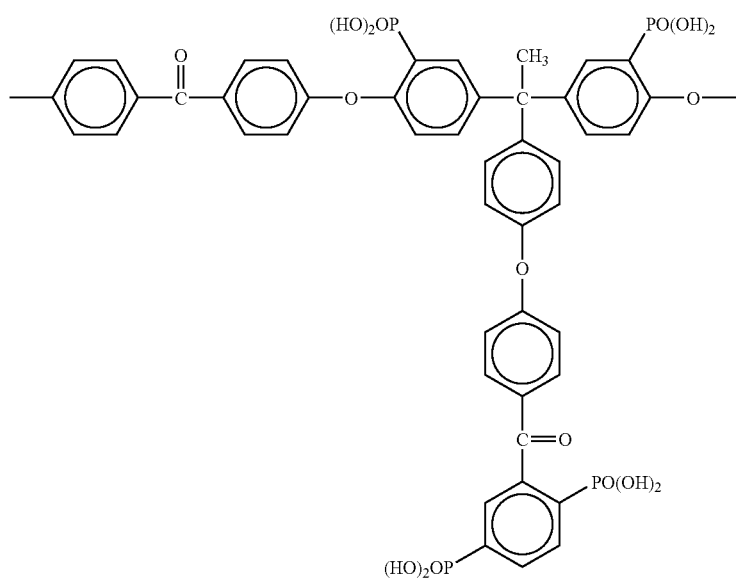
12
As set forth above, formula 4 provides examples of hydrophobic blocks. Specific examples when A is hydrophobic are provided by formulae 13 through 16 and salts thereof:
In another embodiment of the invention, a block copolymer for use as a solid polymer electrolyte is provided. The copolymer of this embodiment is described by formula 1:
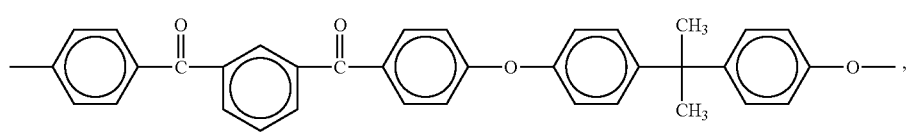
13
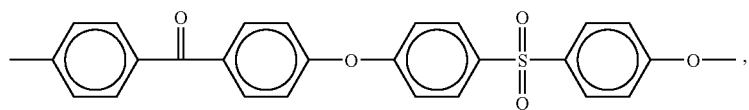
14
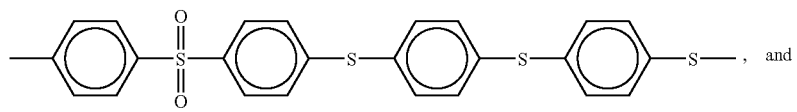
15
, and
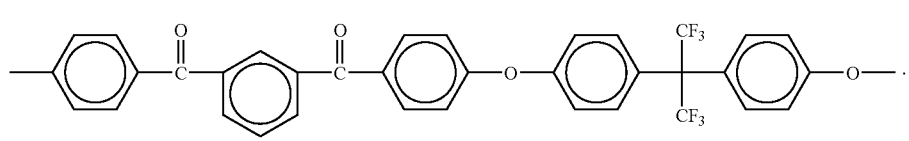
16

$(A_mB_n)_p$  1 wherein A is a first polymer segment described by formula 4:

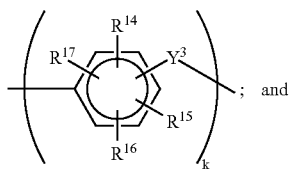  4

B is a second polymer segment described by formula 2:

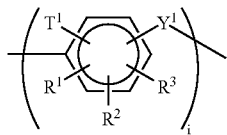  2

$Y^1$ and $Y^3$ are each independently —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next aromatic ring, or

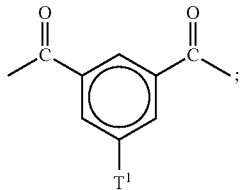

$R^1$, $R^2$, and $R^3$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

$R^4$ is H, $C_{1-10}$ alkyl, $C_{6-18}$ aryl, or $C_{6-18}$ aralkyl;

M is a metal, ammonium, or alkylammonium;

$R^{14}$, $R^{15}$, $R^{16}$, and $R^{17}$ are each independently H, $C_{1-18}$ alkyl, $C_{6-18}$ aryl, or $C_{6-18}$ aralkyl;

$T^1$ is H or a moiety having at least one substituent for proton transfer as set forth above;

m, n, p are each independently an integer;

i is an integer from 1 to 6; and k is an integer from 1 to 6.

The polymer segment described by formula 2 is further limited by the proviso that when i>1, the $Y^1$ between sequential aromatic rings are the same or different; the $T^1$ on sequential aromatic rings are the same or different; and the $R^1$, $R^2$, and $R^3$ on sequential aromatic rings are the same or different. Moreover, for at least one aromatic ring in formula 2, either $T^1$ is not H or one of $R^1$, $R^2$, or $R^3$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$. The polymer segment described by formula 4 is similarly limited by the proviso that when k>1, the $Y^3$ between sequential aromatic rings are the same or different and the $R^{14}$, $R^{15}$, $R^{16}$, and $R^{17}$ on sequential aromatic rings are the same or different. In a particularly useful variation of this embodiment, m, n are each independently an integer from 1 to 200 and p is an integer from about 1 to 20. Moreover, a particularly useful example of $T^1$ is described by formula 3:

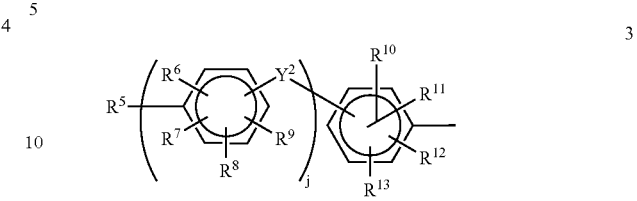  3 wherein:

$Y^2$ is —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, an alkylene, or a bond directly to the next aromatic ring;

$R^4$ is H, $C_{1-10}$ alkyl, $C_{6-18}$ aryl, or $C_{6-18}$ aralkyl;

$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, SO$_3$H, —SO$_3^-$M$^+$, —COOH, —COO$^-$M$^+$, —PO$_3$H$_2$, —PO$_3$H$^-$M$^+$, PO$_3^{2-}$M$_2^+$, or —PO$_3^{2-}$M$^{2+}$;

M is a metal, ammonium, or alkylammonium; and j is an integer from 1 to 30.

Side chain having formula 3 is further limited by the proviso that when j>1, the $Y^2$ between sequential aromatic rings are the same or different and the $R^5$, $R^6$, $R^7$, $R^8$, and $R^9$ on sequential aromatic rings are the same or different. Moreover, at least one of $R^5$, $R^6$, $R^7$, $R^8$, $R^9$, $R^{10}$, $R^{11}$, $R^{12}$, and $R^{13}$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$. In a variation of this embodiment, $R^1$, $R^2$, and $R^3$ are each independently H, —PO$_3$H$_2$, —PO$_3$H$^-$M$^+$, —PO$_3^{2-}$M$_2^+$, or —PO$_3^{2-}$M$^{2+}$; and $T^1$ is H.

In another embodiment of the invention, a block copolymer having formula 1 is provided:

$(A_mB_n)_p$  1 wherein:

A is a first polymer segment;

B is a second polymer segment described by formula 17:

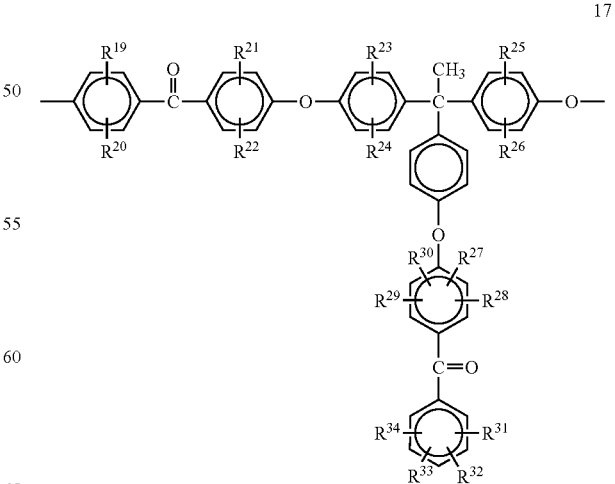  17 m, n, p are each independently an integer;

$R^{19}$, $R^{20}$, $R^{21}$, $R^{22}$, $R^{23}$, $R_{24}$, $R^{25}$, $R^{26}$, $R_{27}$, $R^{28}$, $R^{29}$, $R^{30}$, $R^{31}$, $R^{32}$, $R^{33}$, and $R^{34}$ are each independently H, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$; and M is a metal, ammonium, or alkylammonium.

In a particularly useful variation of this embodiment, m, n are each independently an integer from 1 to 200 and p is an integer from 1 to 20. In another particularly useful variation of this embodiment, A is described by formula 4:

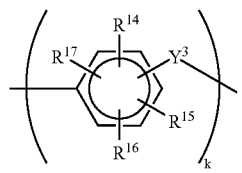

wherein:
Y$^3$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O) (R$^4$)—, diphenyl methylene, diphenyl silicon, fluorenyl, an alkylene, a bond directly to the next aromatic ring, or

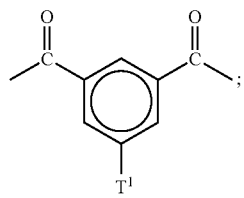

R$^4$ is H, C$_{1-10}$ alkyl, C$_{6-18}$ aryl, or C$_{6-18}$ aralkyl;
T$^1$ is H or a moiety having at least one substituent for proton transfer as set forth above;
R$^{14}$, R$_{15}$, R$^{16}$, and R$^{17}$ are each independently H, C$_{1-18}$ alkyl, C$_{6-18}$ aryl, or C$_{6-18}$ aralkyl; and
k is an integer from 1 to 6.

The polymer segment B described by formula 4 is further limited by the proviso that when k>1, the Y$^3$ between sequential aromatic rings are the same or different; and the R$^{14}$, R$^{15}$, R$^{16}$, and R$^{17}$ on sequential aromatic rings are the same or different.

In another embodiment of the invention, the block copolymers set forth above are used to form an ion conductive membrane. As set forth above, the block copolymers of the invention are characterized by having alternating hydrophobic and hydrophilic polymer blocks that induce a microphase separated morphology when the polymers are formed into films. Due to this microphase separated morphology, the polymer segments with acidic groups are associated in hydrophilic domains that contain essentially no hydrophobic segments. Moreover, the local concentration of acidic groups in the hydrophobic domains is higher than in a randomly sulfonated polymer such as SPEEK. Also, water taken up by membranes will be present only in the hydrophilic domains and not in hydrophobic domains. Therefore, at a given overall IEC value and water content, the block copolymers will contain a higher local IEC and water level within the hydrophilic domains than compared to random copolymers. The microphase separated morphology includes, for example, morphologies such as spheres, cylinders, lamellae, ordered bi-continuous double diamond structures, and combinations thereof. The method of making such membranes begins first with preparation of the block copolymers of the present invention. In a variation of the invention a first polymer having formula 18 is prepared:

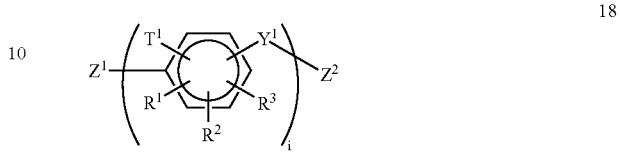

wherein Z$_1$ and Z$_2$ are each independently —SH, —S(O)N (R$^{18}$)$_2$, F, Cl, Br, I, —NO$_2$, or —OH; and R$^{18}$. is H, C$_{1-10}$ alkyl, cycloalkyl, C$_{6-18}$ aryl, or C$_{6-18}$ aralkyl; and T$^1$, R$^1$, R$^2$, R$^3$, Y$^1$ and i are the same as set forth above. Similarly, an end functionalized second polymer block having formula 19 is also synthesized:

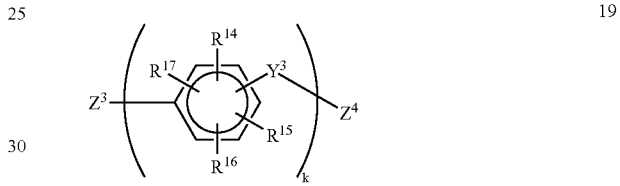

wherein Z$^3$ and Z$^4$ are each independently —H, —SH, —S(O)N(R$^{18}$)$_2$, F, Cl, Br, I, —NO$_2$, or —OH; and R$^{18}$ is H, C$_{1-10}$ alkyl, cycloalkyl, C$_{6-18}$ aryl, or C$_{6-18}$ aralkyl; and R$^{14}$, R$^{15}$, R$^{16}$, R$^{17}$, Y$^3$, and k are the same as those set forth above. The block copolymers in at least some embodiments of the invention are then prepared by reacting polymer block 18 with polymer block 19.

In another variation of the invention, the polymer block having formula 19 is reacted with one or more monomers suitable for forming the polymer block having formula 18. Specifically, the block copolymers of the invention having formula 1 are prepared by synthesizing an end-functionalized polymer block having formula 19:

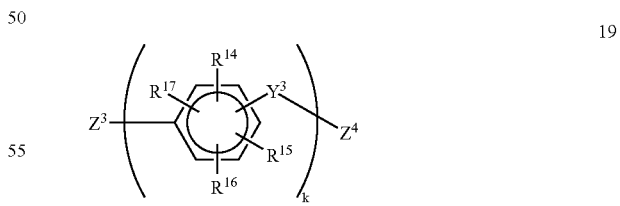

wherein R$^{14}$, R$^{15}$, R$^{16}$, R$^{17}$, Y$^3$, and k are the same as set forth above; Z$^3$ and Z$^4$ are each independently —H, —SH, —S(O) N(R$^{18}$)$_2$, F, Cl, Br, I, —NO$_2$, or —OH; and R$^{18}$ is H, C$_{1-10}$ alkyl, cycloalkyl, C$_{6-18}$ aryl, or C$_{6-18}$ aralkyl. In this embodiment, the polymer block having formula 21 is then reacted with one or more monomers that polymerize into a block having formula 2:

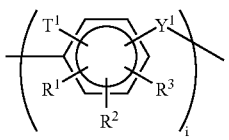

(2)

to form the block copolymer having formula 1, wherein $R^1$, $R^2$, $R^3$, $Y^1$, $T^1$ and i are the same as set forth above.

In yet another variation of this embodiment, the polymer block having formula 18 is reacted with one or more monomers suitable for forming the polymer block having formula 19. Specifically, the block copolymers in at least some embodiments of the invention are formed by synthesizing an end-functionalized polymer block having formula 18:

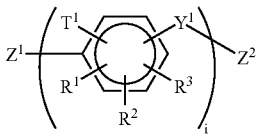

(18)

wherein $R^1$, $R^2$, $R^3$, $Y^1$, $T^1$, and i are the same as set forth above; $Z^1$ and $Z^2$ are each independently —H, —SH, —S(O)N($R^{18}$)$_2$, F, Cl, Br, I, —NO$_2$, or —OH; and $R^{18}$ is H, $C_{1-10}$ alkyl, cycloalkyl, $C_{6-18}$ aryl, or $C_{6-18}$ aralkyl. In the embodiment, the polymer block having formula 18 is then reacted with one or more monomers that polymerize into a block having formula 4:

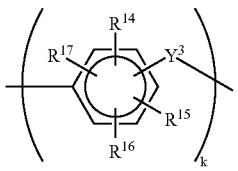

(4)

to form the block copolymer having formula 1, wherein $R^{14}$, $R^{15}$, $R^{16}$, $R^{17}$, $Y^3$, and k are the same as set forth above.

In an example of the preparation of the block copolymer of at least some embodiments of the invention, hydrophobic block 19 is synthesized using one or more non-sulfonated bis-functional monomers. Such bis-functional monomer typically includes two groups that are halogens (F, Cl, Br, I) and OH. The molecular mass (i.e. which is proportional to the number of repeating units) of the block is adjusted by using a defined stoichiometric ratio between the difunctional monomers preferably in the range of 1:2 to 200:1. After the reaction is completed the hydrophobic block is isolated by precipitation in a solvent such as methanol. Next the hydrophobic block is washed with excess amounts of the solvent (i.e., methanol) and subsequently with water. The dried hydrophobic block is used for the preparation of the multiblock copolymer together with the sulfonated monomers. Next, the dried hydrophobic first block is reacted with one or more monomers that includes at least one substituent for proton transfer. In one variation, the monomer that includes at least one substituent for proton transfer is on a side chain as set forth above.

In another variation, the monomer that includes at least one substituent for proton transfer is a —PO$_3$H$_2$, —PO$_3$H$^-$M+, —PO$_3^{2-}$M$_2^+$, or —PO$_3^{2-}$M$^{2+}$. Optionally, one or more additional bis-functional monomers that may or may not include substituents for proton transfer are also reacted with the monomer that does include a substituent for proton transfer. In at least one embodiment, in order to adjust the composition of the multiblock copolymer the necessary ratio between the monomers building the hydrophilic block and the hydrophobic block is used. The polymer is isolated by precipitation and purified in the same manner by precipitation into alcohol as for the hydrophobic blocks but without washing with water since the multiblocks especially when having a large hydrophilic block swell when in contact with water which results in difficulties in filtering the polymer. The resulting polymer flakes are thoroughly dried.

Regardless of the method by which the block copolymers of the invention are formed, the block copolymers are eventually formed or cast into an ion conductive membrane suitable for fuel cell applications. The polymer can be cast from solution in its acid, acid halide or salt form. In addition, a membrane can also be formed by hot pressing or by melt extrusion of the polymer. The behavior of the polymer during hot pressing or during melt extrusion can be improved by transferring the acidic groups in the polymer into ester groups or other protective groups, which can be returned into acid groups after melt processing. In one variation, the acid groups of the block copolymer are transformed to acid halide groups to form a modified block copolymer. Then a film is cast from a solution of the modified block copolymer onto a substrate. Finally, the acid halide groups are transformed back into the acid groups to form the ion conductive membrane. After formation of the multiblock copolymers of the present invention, ion conductive membranes can be formed. In a first refinement of this embodiment, the dried polymer is dissolved in a suitable solvent (i.e., DMSO). The polymer solution is then poured into a Petri dish and is covered with a lid in such a way that there is a small gap between the dish and the lid to allow for slow evaporation of the solvent. In another refinement, the dried polymer is also dissolved in a suitable solvent to form a viscous solution. The viscous solution is spread onto a glass plate and brought to a uniform thickness by means of a doctor blade. For both these refinements, the solvent is then removed by drying at elevated temperature in an oven. Finally, the morphology is adjusted by annealing the membrane at an elevated temperature. Typically, this annealing is performed at reduced pressures or in a vacuum. Useful annealing temperatures are either between the glass transition or melting temperatures of the two block types, or between the highest of the glass stransition or melt temperatures of the two block types and the order-disorder transition temperature (if present). Temperatures between about 100° C. and 300° C. are useful with an optimal anneal temperature being about 200° C. In some variations of the invention, the after polycondensation steps, the multiblock copolymer of the invention is obtained a sulfonic acid salt or phosphorus acid salt. Therefore the membrane is converted into its free sulfonic acid form prior to use. This conversion is accomplished by containing the membranes with a diluted acid (e. g. 1 molar sulfuric acid) for 24 hours. Afterwards the membranes are rinsed thoroughly with DI water to remove excessive acid.

Ion conducting membranes formed by the polymers set forth in the examples can be characterized by the ion exchange capacity ("IEC"), water uptake, and specific conductivity.

1. Determination of the IEC by Titration:

Membrane pieces in the sulfonic acid form are dried at 120° C. and vacuum for at least 2 hours. About 100 mg of the polymer and 50 ml of aqueous LiCl solution with a concentration of 2 mol/l are put into an Erlenmeyer flask with a cover. The closed flask is placed in an oven at 60° C. over night for the cation exchange. The solution is cooled down to room temperature and three drops of a 0.5 wt. % ethanolic phenolphthalein solution are added as an indicator. The solution including the membrane pieces are titrated with a sodium hydroxide solution having a concentration of 0.1008 mol/l until the first incidence of a pink coloration. If the color fades after 30 seconds, additional drops of the sodium hydroxide solution are added until the pink color persists. The IEC is calculated according to the following equation (V(NaOH) is volume of the NaOH solution and c(NaOH) is the concentration of the NaOH solution:

$$IEC[meq/g] = \frac{c(NaOH)[mol/l] \cdot V(NaOH)\ [ml]}{m(\text{dry polymer})\ [g]}$$

The titration is repeated 5 times for each polymer analyzed.

2. Determination of the Water Uptake

Membrane pieces with a size of about 1 cm² are placed in water at a 5 predetermined temperature and equilibrated for several hours. The wet membrane pieces are padded dry with a paper wipe and weighed with a balance having an accuracy of ±1 μg. The water uptake is calculated according to the following equation:

$$\text{water uptake }[\%] = \frac{m(\text{wet polymer})\ [mg] - m(\text{dry polymer})\ [mg]}{m(\text{dry polymer})\ [mg]} \cdot 100$$

The measurement is conducted with five pieces for each polymer analyzed.

3. Measurement of the Specific Conductivity:

The specific conductivity measurements are conducted at different temperatures and different relative humidities or in water at different temperatures. The analyzed membranes are in the sulfonic acid form. The impedance is measured with a 4-probe setup. Specifically, AC measurements are carried out at a fixed frequency of 1 kHz with a Fluke RCL meter PM6304. The specific conductivity can be calculated according to the following equation:

$$\sigma[S/cm] = \frac{1}{Z} \frac{l_{SE}}{w_M \cdot t_M} = \frac{200}{Z[k\Omega] \cdot w_M\ [mm] \cdot t_M\ [\mu m]}$$

where $W_M$ is the width and $t_M$ the thickness of the membrane and $I_{SE}$ is the distance between the two sensor electrodes which is fixed at 20 mm for this sample holder. A Teflon cap is placed on top of the membrane by pressing the membrane with a clamp.

4. Measurement Conditions a. In Water

Measurements in water are performed by first equilibrating the membrane sample in water to ensure that the sample is at a uniform temperature. A uniform temperature is necessary because clamping of the membrane against the electrodes in the sample holder the measurement would be inaccurate if the membrane does not swell homogenously in all directions at elevated temperatures. The width and thickness is measured after the sample is released from the sample holder. The impedance readings are taken after the values stabilize without significant change.

b. At Defined Relative Humidities

The relative humidity ("R.H.") is determined by using saturated salt solutions. Polymer samples are is placed in a sample holder positioned above the salt solution. Adjustment of a specific humidity requires the use of a closed container. The following saturated salt solution are used for producing the R.H. at 80° C. (ASTM, E104-02):

| Salt | NaCl | NaBr | $MgCl_2$ |
|---|---|---|---|
| R.H. @ 80° C. | 74% | 51% | 26% |

Figure 2:
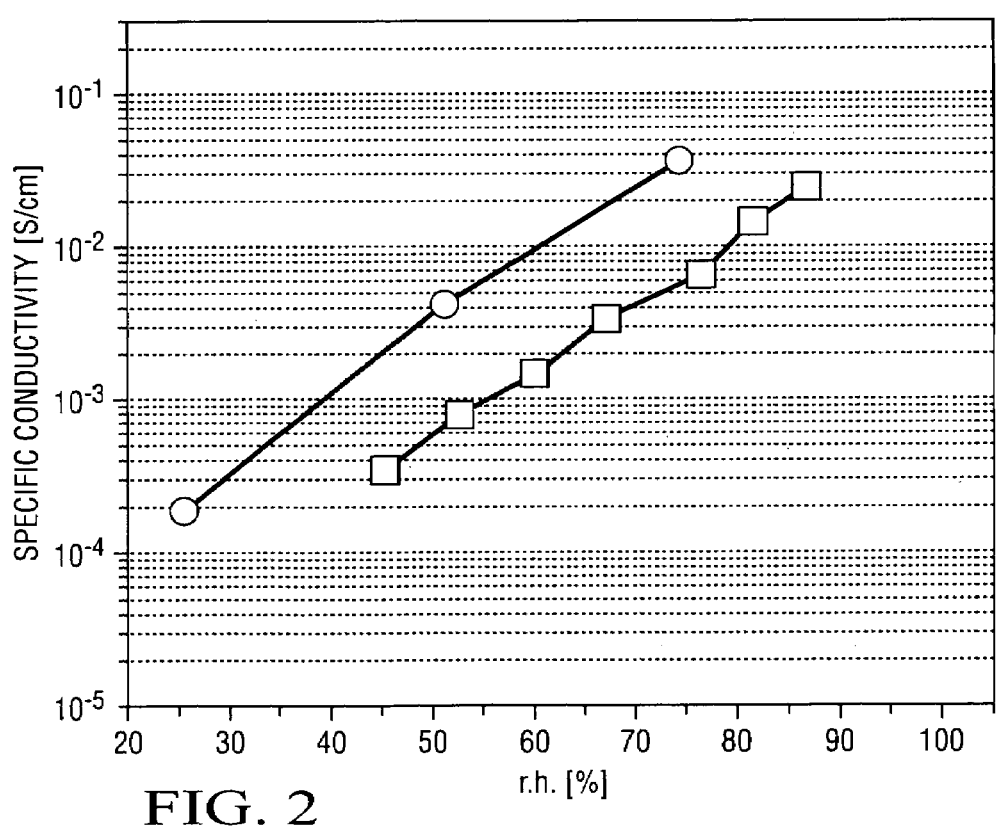
FIG. 2 provides plots that compare specific conductivities vs. relative humidity at 80° C. for various sulfonated poly(ether sulfone)s that include literature data for random sulfonation (squares, IEC=2.48) and a block copolymer with side chain sulfonation (circles, Example 2 having an IEC=2.5).

With reference to FIG. 1, a comparison of the specific conductivities for example 1, example 2, and example 3 are provided. Example 1 is a comparative example that possesses sulfonation only on the main chain, the block copolymer of example 2 has sulfonation on the side chain, and example 3 has sulfonation on both the side and main chain. Both examples 2 and 3 have higher specific conductivities than comparative example 1, with the polymer from example 3 being the highest. With reference to FIG. 2, plots comparing the specific conductivities as a function of relative humidity for a polymer having formula 20 to a block copolymer from example 2 are provided. Again, the conductivity of the block copolymer of the present invention with sulfonation on the side chain is observed to be higher.

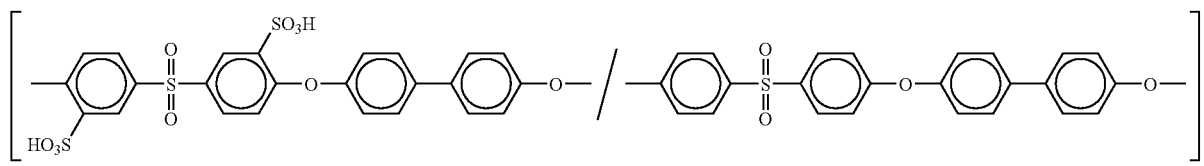

20

Table 1 provides a comparison of the physical properties of polymers containing phosphonic acid groups versus sulfonic acid groups. Significantly, the block copolymers that have phosphonic acid groups have significantly higher conductivities although the water uptake is much lower than polymers with sulfonic acid groups.

TABLE 1

Physical properties of block copolymers.

| Acid group | IEC (elemental analyis) meq/g | IEC (titrated) Meq/g | Water uptake % (room temperature, liquid water) | Conductivity (80° C., 26% R.H.) S/cm | Conductivity (80° C., liquid water) S/cm |
| --- | --- | --- | --- | --- | --- |
| Phosponic | 1.7 | 0.16 | 7 | 0.0003 | 0.09 |
| Sulfonic | | 1.7 | 70 | 0.00009 | |

EXAMPLE 1

Synthesis of Block Copolymer Having Formula 21 and the mixture is heated for an additional 18 hour at 180° C. The mixture is filtered and diluted with 150 ml NMP. The solution is poured into 3 l methanol under vigorous stirring. The precipitated solid is washed with 1 l methanol, 1 l D. I. water (70-80° C.), 1 l methanol and dried at 100° C. in vacuum. The yield is 46 g (88%).

B) Preparation of Multiblock Copolymer Having Formula 21 (Calc. IEC 1.8 meq/g)

The polymer block having formula 22 (4.00 g, ca. 0.001 mol), hydoquinone-2-potassium sulfonate (5.03 g, 0.022 mol), 4,4'-Difluorobenzophenon (4.64 g, 0.021 mol), potas-

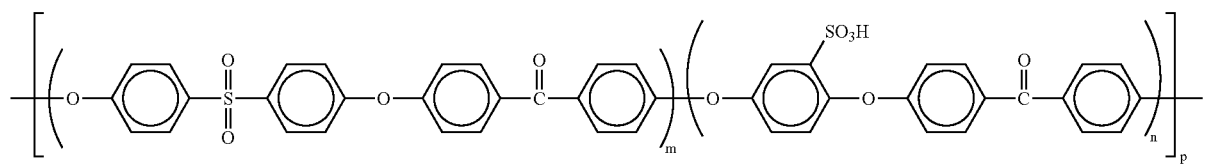

A) Preparation of Block Having Formula 22

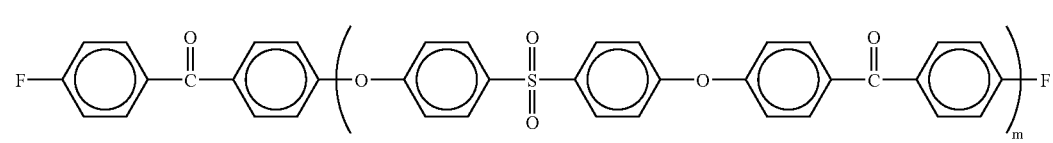

Bis-(4-hydroxyphenyl)-sulfone (30.00 g, 0.1199 mol), 4,4'-Difluorobenzophenone (32.85 g, 0.1505 mol), potassium carbonate (35.67 g, 0.256 mol), 170 ml anhydrous N-methyl-pyrrolidone and 75 ml anhydrous benzene are added to a 500 ml flask equipped with a Dean-Stark trap, a reflux condenser and a nitrogen inlet. The mixture is refluxed at 140° C. for 3 hour under nitrogen atmosphere. The benzene is removed, sium carbonate (6.1 g, 0.044 mol), 90 ml anhydrous and 40 ml anhydrous benzene are added to a 250 ml flask equipped with a Dean-Stark trap, reflux condenser and a nitrogen inlet. The mixture is refluxed at 140° C. for 3 hours under nitrogen. The benzene is removed and the mixture is heated for an additional 21 hours at 180° C. The mixture is filtered and diluted with DMSO. The solution is then poured into 3 l methanol under vigorous stirring. The precipitated solid is washed with methanol and dried at 100° C. in vacuum. The yield is 10 g (79%). Membranes having a thickness of about 50 μm are cast from a DMSO solution and dried at 60° C. An IEC of 1.7 meq/g is determined by titration.
EXAMPLE 2
Synthesis of Block Copolymer Having Formula 23
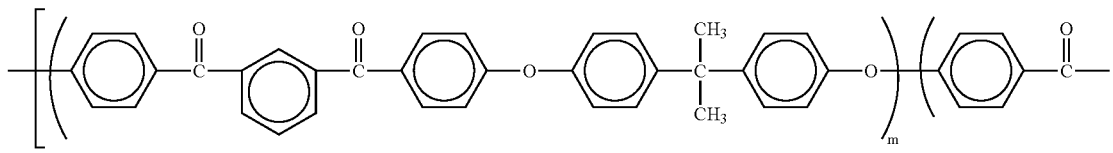
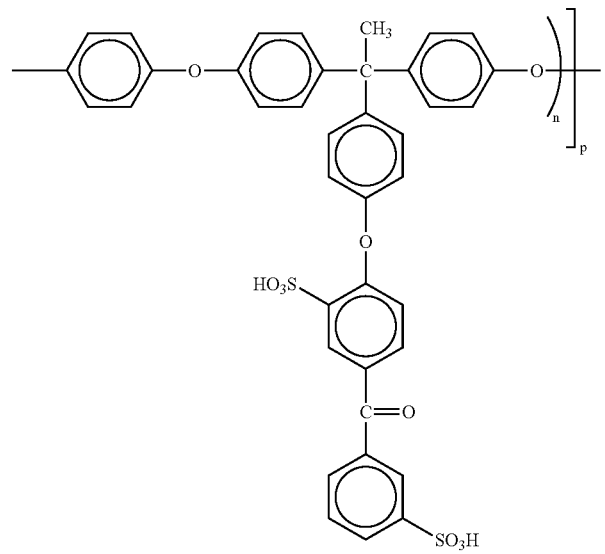
A) Preparation of Polymer Block Having Formula 24
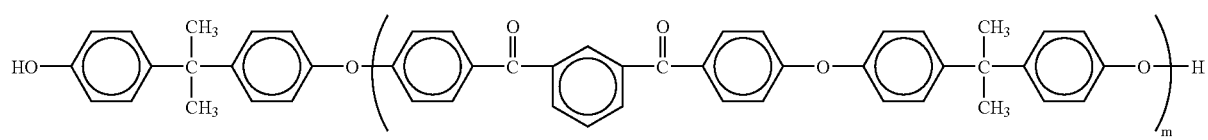

Potassium carbonate (214.3 g, 1.55 mol), 2,2-Bis-(4-hydroxy-phenyl)-propane (176.96 g, 0.775 mol), 1,3-Bis-(4-fluorbenzoyl)benzene (154.72 g, 0.480 mol), 1.5 l anhydrous N-methyl-pyrrolidone and 200 ml anhydrous cyclohexene are added to a 2 l flask equipped with a Dean-Stark trap, a reflux condenser and a nitrogen inlet. The mixture is refluxed at 140° C. for 3 hour under nitrogen. Benzene is removed, and the mixture is heated for further 24 hour at 180° C. The mixture is filtered and diluted with 150 ml NMP. The solution is poured into 10 l methanol under vigorous stirring. The precipitated solid is washed with 2 l methanol, 2 l D. I. water (70-80° C.), 1 l methanol and dried at 100° C. in vacuum. The yield is 200 g (66%).

B) Preparation of Multiblock Copolymer Having Formula 23 (Calc. IEC=1.7 meq/g)

Polymer block having formula 24 (1.129 g, ca. 0.0005 mol), the sulfonated THPE side chain monomer having formula 25 (2.602 g, 0.0035 mol), 4,4'-difluorobenzophenon (0.869 g, 0.0040 mol), potassium carbonate (1.0 g, 0.07 mol), 25 ml anhydrous, and 25 ml anhydrous benzene are added to a 100 ml flask equipped with a Dean-Stark trap, reflux condenser and a nitrogen inlet. The mixture is refluxed at 140° C. for 3 hour under nitrogen. The benzene is removed and the mixture is heated for 4 hour at 200° C. The mixture is filtered, diluted with DMSO and the solution is poured into an excessive amount of methanol under vigorous stirring. The precipitated solid is washed with methanol and dried at 100° C. in vacuum. The yield is 4.5 g (90%). Membranes having a thickness of about 70 μm are cast from a DMSO solution and dried at 60° C. An IEC of 1.5 meq/g is determined by titration.

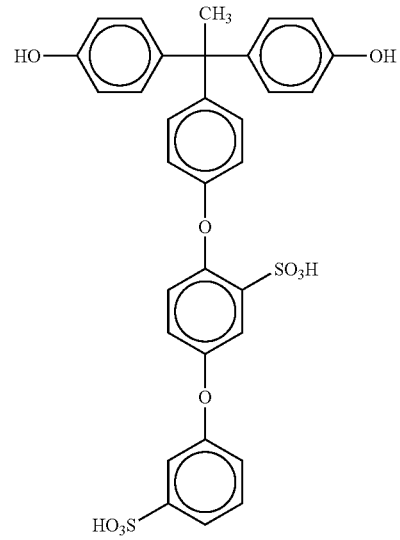

EXAMPLE 3

Synthesis of Multiblock Copolymer Having Formula 26 (Calc. IEC=2.7 meq/g)

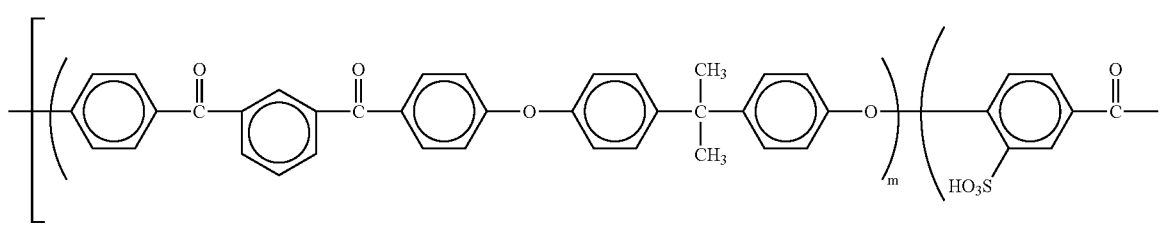

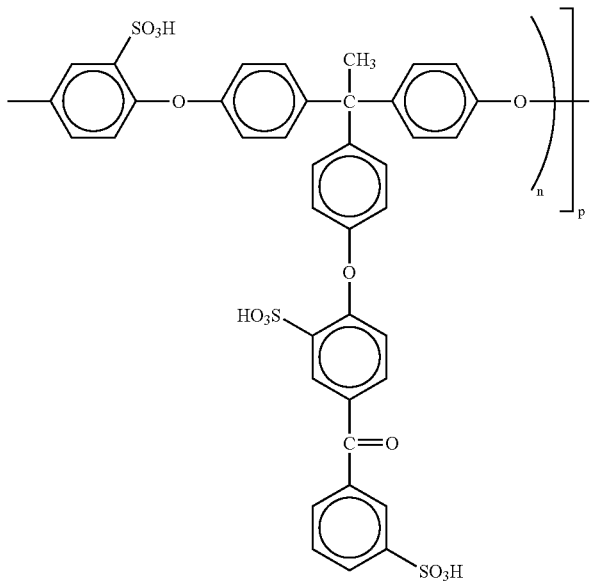

Polymer block having formula 24 (from Example 2A)) (1.92 g, ca. 0.0008 mol), the sulfonated THPE side chain monomer having formula 25 (2.433 g, 0.0033 mol), 4,4'-difluoro-3,3'-di(potassium sulfonate)-benzophenon (1.863 g, 0.0041 mol), potassium carbonate (0.93 g, 0.067 mol), 25 ml anhydrous DMSO and 25 ml anhydrous benzene are added to a 100 ml flask equipped with a Dean-Stark trap, reflux condenser and a nitrogen inlet. The mixture is refluxed at 140° C. for 3 hour under nitrogen. The benzene is removed and the mixture is heated for an additional 4 hours at 200° C. The mixture is filtered, diluted with DMSO and the solution is poured in an excessive amount of methanol under vigorous stirring. The precipitated solid is washed with methanol and dried at 100° C. in vacuum. The yield is 6 g (85%). Membranes having a thickness of about 40 μm are cast from a DMSO solution and dried at 60° C. An IEC of 2.5 meq/g is determined by titration.

EXAMPLE 4

Synthesis of Multiblock Copolymer Having Formula 27

A) Synthesis of (4-bromophenyl)(4'-fluorophenyl)methanone (Formula 28)

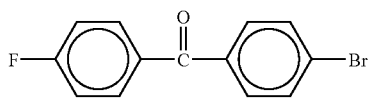

4-Fluorobenzoyl chloride (238 g, 1.5 mol) is added under an atmosphere of nitrogen over a period of 1 hour to a suspension of anhydrous aluminium chloride (224 g, 1.68 mol) and 700 ml bromobenzene while maintaining the temperature below 30° C. After the addition is complete, the solution is heated at 90° C. for 3 hour. The reaction solution is added to 500 g crushed ice. The mixture is allowed to warm to room temperature and the water phase is extracted with dichloromethane (3 times with 200 ml). The organic extracts are combined, washed with water (200 ml), saturated sodium hydrogene carbonate solution (200 ml), water (200 ml), dried over sodium sulphate, filtered, and evaporated to dryness. The residue is crystallized twice from petroleum ether (b.p.: 36-80° C.) to obtain a pale yellow powder. The yield is 240-278 g (57-67%).

B) Synthesis of diethyl 4-(4-fluorobenzoyl)phenylphosphonate (Formula 29)

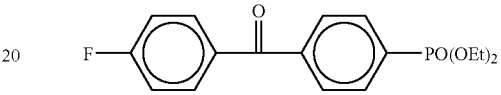

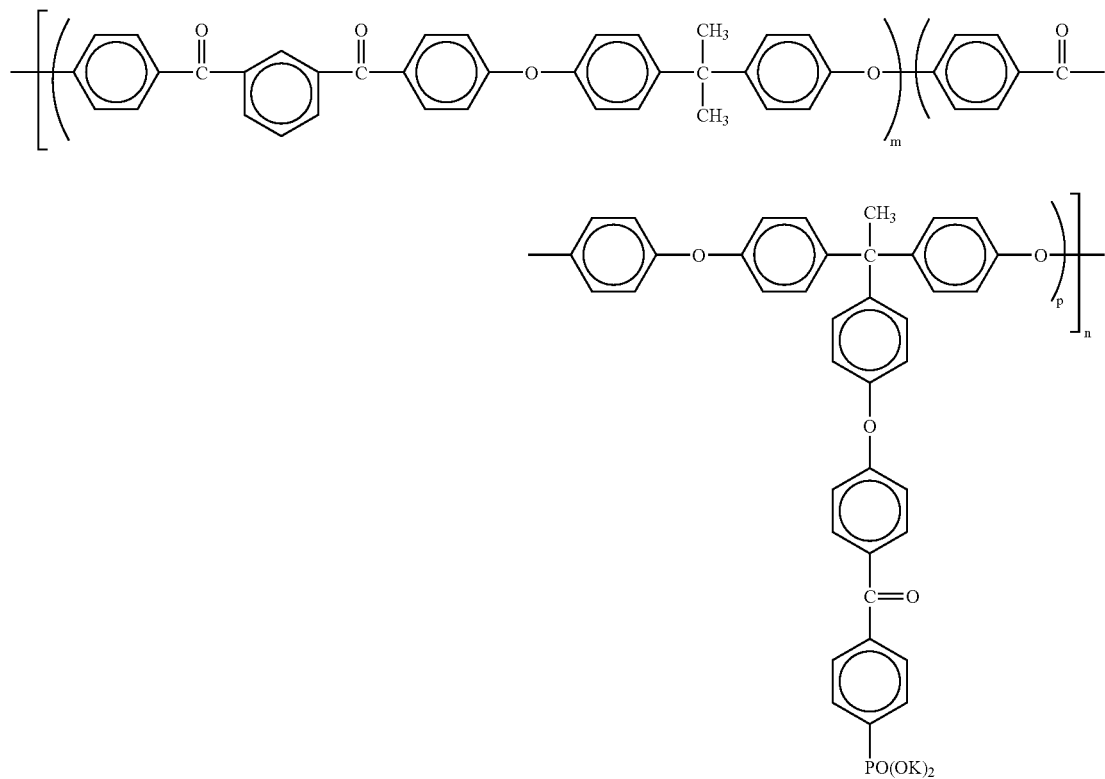

(4-Bromophenyl)(4'-fluorophenyl)methanone (formula 28) (400 g, 1.43 mol) from Example 4A and anhydrous nickel bromide (35 g, 0.16 mol) are heated to 160° C. under an atmosphere of nitrogen. A green-blue colored melt is obtained. Then triethyl phosphite (304 g, 1.83 mol) is added over a period of 1 hour while maintaining the temperature between 160 and 165° C. The mixture is stirred at this temperature for an additional hour. Distillation of the mixture gave a pale yellow oil, b.p. 187-188° C./10-2 mbar. The yield is 304-326 g (63-68%).

C) Synthesis of potassium 4-(4-fluorobenzoyl)phenylphosphonate (Formula 30)

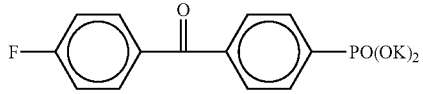

Diethyl 4-(4-fluorobenzoyl)phenylphosphonate (formula 29) (80 g, 0.24 mol) in 100 ml hydrobromic acid (48%) is heated under vigorous stirring for 60 hour at reflux. Additionally at regular intervals 300 ml hydrobromic acide (48%) is added. The generated white solid is filtered off, washed with water (3 times with 300 ml water) and dried. The yield of the released phosphonic acid is 66-69 g (89-91%). The potassium salt of the phosphonic acid is established by boiling a aqueous solution (15-30 wt %) of the phosphonic acid with equimolar quantities of potassium hydroxide until a clear solution is obtained. Then the solution is evaporated to dryness and the resulting salt is used without further purification.

D) Synthesis of potassium 4-(4-{3-(di(4-hydroxyphenyl)ethyl)phenoxy}benzoyl)phenylphosphonate (Formula 31)

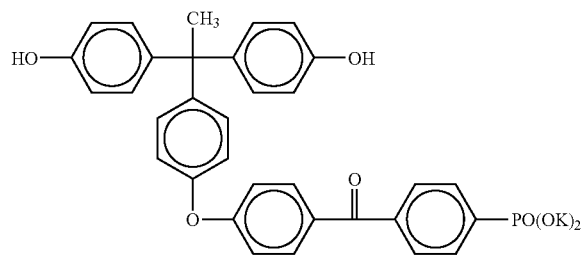

1,1,1-Tris-(4-hydroxyphenyl)-ethane (551 g, 1.80 mol) and potassium carbonate (74 g, 0.54 mol) are added to 1.5 l anhydrous dimethyl sulphoxide (DMSO) under an atmosphere of nitrogen. The temperature is raised to 120° C. Then the compound having formula 30 (127 g, 0.36 mol) is added to 600 ml anhydrous DMSO at 100° C. and distilled water is added until a clear solution is obtained. This solution is added over a period of 4-5 hour while maintaining the temperature between 120 and 125° C. After the addition is complete the mixture is stirred at this temperature for 14-15 hour. Then the solvent is distilled off and the resulting residue is added to a mixture of 500 ml distilled water and 400 ml ethyl acetate. The water phase is neutralized with hydrochloride acid and then extracted with ethyl acetate (5×'s 300 ml). The combined organic extracts are washed once with water. Afterwards the combined water phases are evaporated to dryness and the residue is extracted with methanol (3×'s 100 ml). The product is purified by adding the combined methanol extracts to 1.5 l diethyl ether, followed by twice recrystallization of the precipitated solid in a mixture of distilled water/ethanol. The yield is 53-72 g (23-31%).

E) Synthesis of Side Chain Phosphonated Multiblock Having Formula 27

The OH-terminated polymer block having formula 24 (2.4009 g, 0.469 mmol), 4,4'-Difluorobenzophenone (0.6146 g, 2.817 mmol), side chain phosphonated monomer having formula 31 (1.5087 g, 2.347 mmol), and potassium carbonate (0.8565 g, 6.200 mmol) are dissolved in a mixture of 24 ml anhydrous 1,3-Dimethyl-3,4,5,6-tetrahydro-2(1H)-pyrimidinone ("DMPU") and 25 ml anhydrous benzene in a 100 ml flask equipped with a Dean-Stark trap and reflux condenser. Then the mixture is refluxed at 140° C. for 3 hour under nitrogen. Benzene is removed and the mixture is heated for 2.5 hour at 180° C. The highly viscous mixture is poured into a mixture of 500 ml distilled water and 50 ml hydrochloric acid (37%). The precipitated solid is washed with 2 l distilled water. The yield is 4.03 g (91%). Polymer prepared in DMPU can be cast into membranes from DMAC solution. Membranes are transparent but brittle: No determination of conductivity, water uptake etc.

EXAMPLE 5

Synthesis of Block Copolymer Having Formula 32

A) Synthesis of F-Terminated Block Copolymer Having Formula 33:

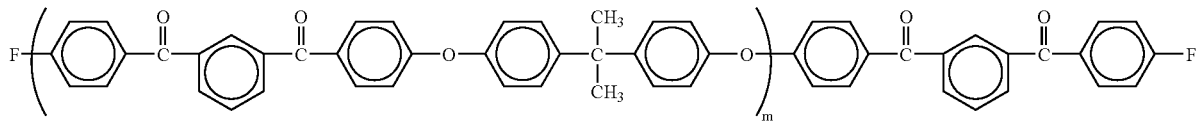

33

2,2-bis-(4-hydroxyphenyl)propane (44.7108 g, 0.196 mol), 1,3-bis-(4-fluorbenzoyl)benzene (70.0150 g, 0.217 mol) and potassium carbonate (54.14 g, 0.392 mol) are dissolved in a mixture of 300 ml anhydrous N-methyl-pyrrolidone (NMP) and 75 ml anhydrous benzene in a 500 ml flask equipped with a Dean-Stark trap and reflux condenser. The mixture is refluxed at 140° C. for 4 hour under nitrogen. Benzene is removed, and the mixture is heated for further 24 hour at 180° C. The mixture is filtered, diluted with 150 ml NMP and 150 ml tetrahydrofuran and the solution poured into 3 l methanol. The precipitated solid is washed with 1 l methanol, 1 l distilled water (70-80° C.), 1 l methanol and dried. The yield is 99 g (93%).

B) Bromination of F-Terminated Block Having Formula 34:

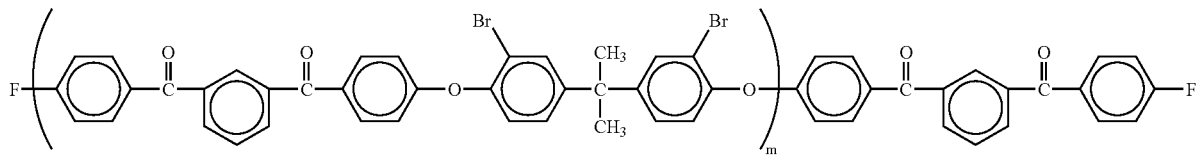

34

Bromine (316 g, 1.98 mol) is dissolved in 200 ml chloroform and added to a solution of the F-terminated block polymer having formula 33 (106 g) in 1.2 l chloroform at room temperature over a period of 4 hour. Then the mixture is slowly raised (2 hours) to refluxing temperature and boiled for 15 hour at reflux. The mixture is allowed to cool and precipitated in methanol. The solid is washed twice with methanol and dried. The yield is 100 g.

C) Synthesis of Brominated Block Copolymer Having Formula 35:

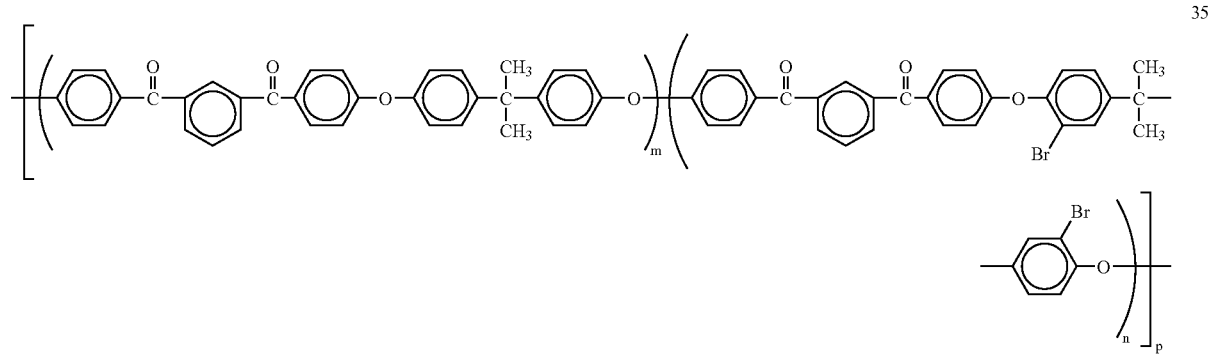

35

Brominated block having formula 34 (22.0090 g, 1.95 mmol), 1,3-bis-(4-fluorbenzoyl)benzene (3.7719 g, 11.71 mmol), 2,2-bis-(4-hydroxyphenyl)-propane (3.1168 g, 13.65 mmol) and potassium carbonate (4.152 g, 30.04 mmol) are dissolved in a mixture of 110 ml anhydrous N-methyl-pyrrolidone ("NMP") and 40 ml anhydrous benzene in a 250 ml flask equipped with a Dean-Stark trap and reflux condenser. The mixture is refluxed at 140° C. for 4 hour under nitrogen. Benzene is removed, further 30 ml NMP is added and the mixture is heated for 24 hour at 180° C. The mixture is filtered, diluted with 300 ml NMP and 350 ml tetrahydrofuran and the solution poured into 4 l methanol. The precipitated solid is washed with 1 l methanol, 1 l distilled water (70-80° C.), 1 l methanol and dried. The yield is 27 g (95%).

D) Synthesis of Phosphonated Block Copolymer Having Formula 36:

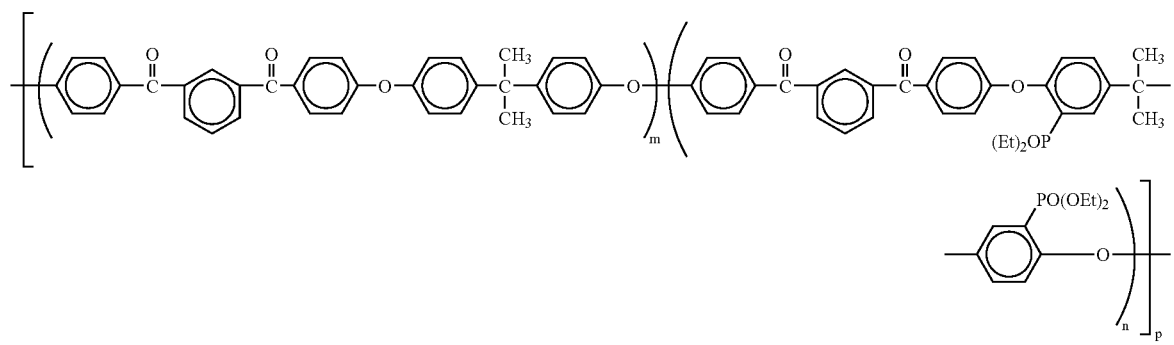

Brominated block copolymer having formula 35 (4.0 g) and anhydrous nickel bromide (0.33 g) is added to a mixture of 70 ml anhydrous diethylene glycol dimethyl ether and 20 ml N-methyl-pyrrolidone under an atmosphere of nitrogen. The temperature is raised to 155° C. and triethyl phosphite (6.0 g) is added over a period of 20 minutes at 150-15° C. After 30 minutes further anhydrous nickel bromide (0.33 g) is added and the solution is stirred for 4 hour. Then the solution is allowed to cool somewhat and poured into 1 l distilled water. The precipitated solid is washed with 500 ml methanol, 500 ml distilled water (70-80° C.), 500 ml methanol and dried. The yield is 3.8 g.

E) Conversion to Phosphonated Polymer Having Formula 32—Generation of PO(OH)$_2$-Groups:

Addition of phosphonated block copolymer having formula 36 (3.3 g) to 150 ml anhydrous dichloromethane under an atmosphere of nitrogen resulted a gel-like mass. A clear solution is obtained by adding bromotrimethylsilane (4.6 g) over a period of 20 minutes at room temperature to the mixture. After the addition is complete, the solution is stirred for 40 minutes at room temperature and heated for 1 hour at reflux. Then the solution is allowed to cool somewhat and poured into 1 l methanol. The precipitated solid is washed twice with methanol and dried. The yield is 2.9 g. Polymer can be cast into membranes from DMAC solution. Such membranes are transparent and not brittle. The phosphonated polymer having formula 30 is observed to have a water uptake in liquid water at RT 7% and a proton conductivity of 0.09 S/cm at 30° C. in water and 0.0003 S/cm at 80° C. and 26% R.H.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A block copolymer for use as a solid polymer electrolyte, the block copolymer comprising a polymer having formula 1:

$$(A_m B_n)_p \qquad 1$$

wherein

A is a first polymer segment that is repeated m times to form first polymer block $A_m$;

B is a second polymer segment that is repeated n times to form second polymer block $B_n$, B being described by formula 2:

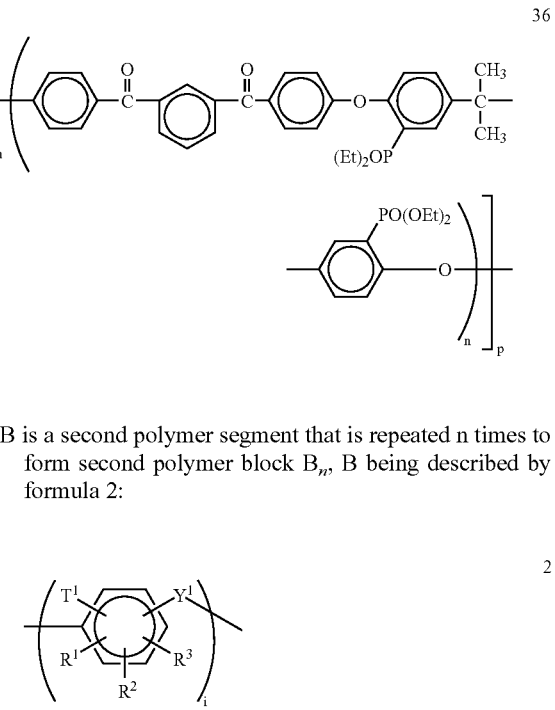

$Y^1$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next aromatic ring, or

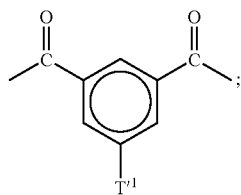

R$^1$, R$^2$, and R$^3$ are each independently H, C$_{1-10}$ alkyl, C$_{6-18}$ aryl, C$_{6-18}$ aralkyl, SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

R$^4$ is H, C$_{1-10}$ alkyl, C$_{6-18}$ aryl, or C$_{6-18}$ aralkyl;

T$^1$ is H or a moiety having at least one substituent for proton transfer;

i is an integer from 1 to 6; and

T$^1$ is described by formula 3;

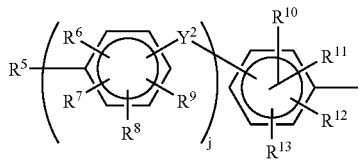

- $Y^2$ is —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, an alkylene, or a bond directly to the next aromatic ring;
- $R^4$ is H, $C_{1-10}$ alkyl, $C_{6-18}$ aryl, or $C_{6-18}$ aralkyl;
- $R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, SO$_3$H, —COOH, —COO$^-$M$^+$, —PO$_3$H$_2$, —PO$_3$H$^-$M$^+$, —PO$_3{}^{2-}$M$_2{}^+$, or —PO$_3{}^{2-}$M$^{2+}$;
- M is a metal, ammonium, or alkylamonium; and
- j is an integer from 1 to 30;

with the proviso that when j>1, the $Y^2$ between sequential aromatic rings are the same or different: the $R^5$, $R^6$, $R^7$, $R^8$, and $R^9$ on sequential aromatic rings are the same or different, wherein at least one of $R^5$, $R^6$, $R^7$, $R^8$, $R^9$, $R^{10}$, $R^{11}$, $R^{12}$, and $R^{13}$ is —SO$_3$H, —SO$_3{}^-$M$^+$, —COOH, —COO$^-$M$^+$, —PO$_3$H$_2$, —PO$_3$H$^-$M$^+$, —PO$_3{}^{2-}$M$_2{}^+$, or —PO$_3{}^{2-}$M$^{2+}$;

m, n are each independently an integer from 1 to 200; and p is an integer from 1 to 20;

wherein first polymer block A$_m$ is bonded to second polymer block B$_n$ and the block copolymer is formable into an ion-conductive membrane with the proviso that when i>1, the $Y^1$ between sequential aromatic rings are the same or different: the $T^1$ and $T^1$ on sequential aromatic rings are the same or different; the $R^1$, $R^2$, and $R^3$ on sequential aromatic rings are the same or different.

2. The block copolymer of claim 1 wherein the at least one substituent for proton transfer comprises an acidic substituent or a salt of a conjugate base thereof.

3. The block copolymer of claim 1 wherein the first polymer block A$_m$ is hydrophobic and the second polymer block B$_n$ is hyrdrophilic.

4. The block copolymer of claim 3 wherein the block copolymer has a micro-phase separated morphology.

5. The block copolymer of claim 4 wherein the microphase separated morphology comprise spheres, cylinders, lamellae, ordered bi-continuous double diamond structures, disordered bicontinuous morphologies, and combinations thereof.

6. The block copolymer of claim 1 wherein the first block has a molecular weight from about $5 \times 10^2$ to about $5 \times 10^5$ (g/mol) and the second polymer block has a molecular weight from about $5 \times 10^2$ to about $5 \times 10^5$ (g/mol).

7. The block copolymer of claim 1 wherein the at least one substituent for proton transfer is selected from the group consisting of —SO$_3$H, —SO$_3{}^-$M$^+$, —COOH, —COO$^-$M$^+$, —PO$_3$H$_2$, —PO$_3$H$^-$M$^+$, —PO$_3{}^{2-}$M$_2{}^+$, —PO$_3{}^{2-}$M$^{2+}$, and combinations thereof wherein M is an alkali or alkaline-earth metal, ammonium, or alkylammonium.

8. The block copolymer of claim 1 wherein B comprises a component selected from the group consisting of segments having formulae 5 to 12, and salts thereof:

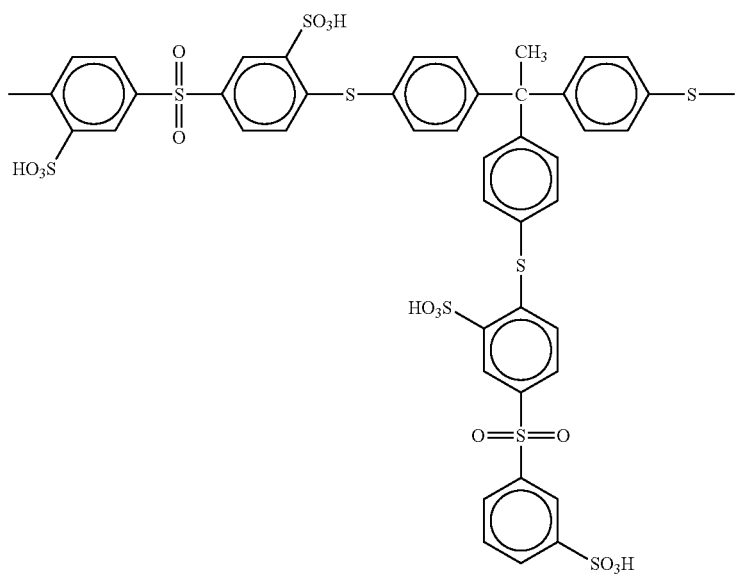

-continued
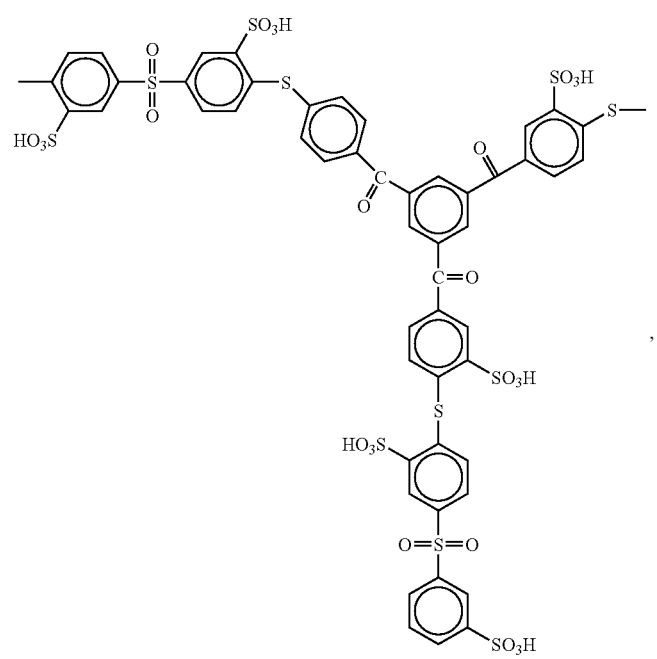
6
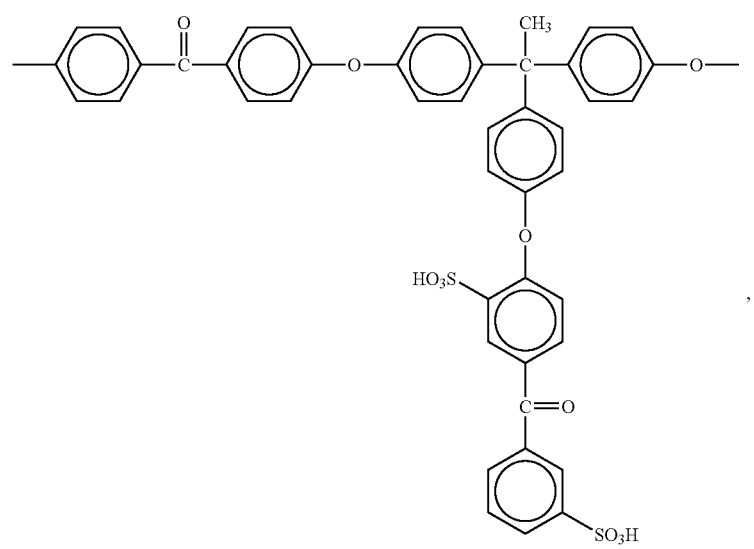
7

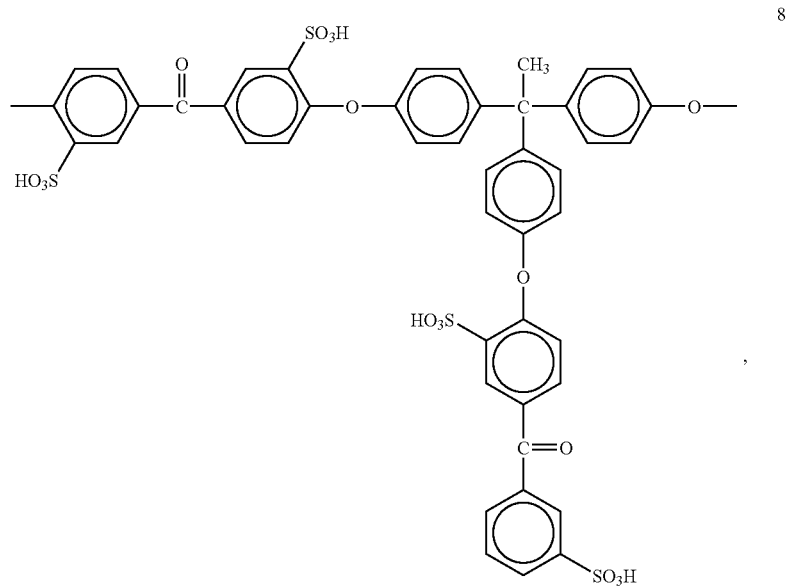
8
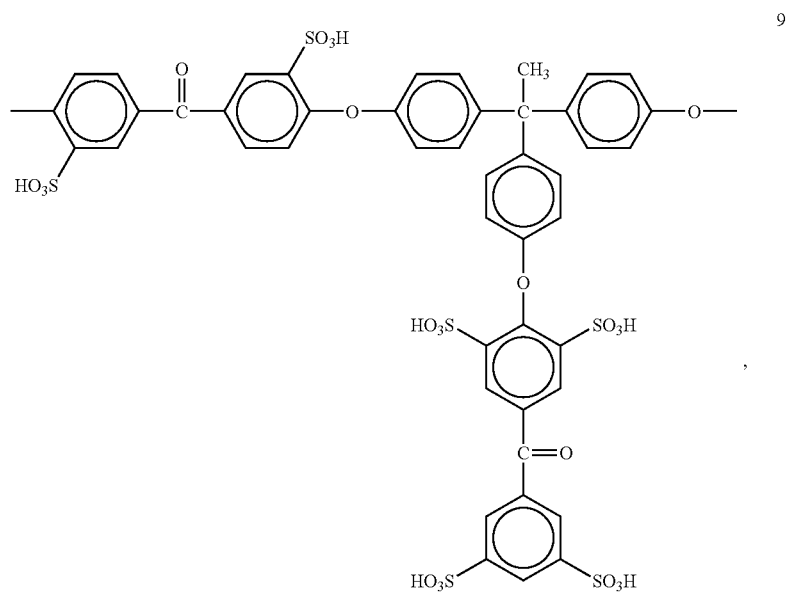
9

-continued
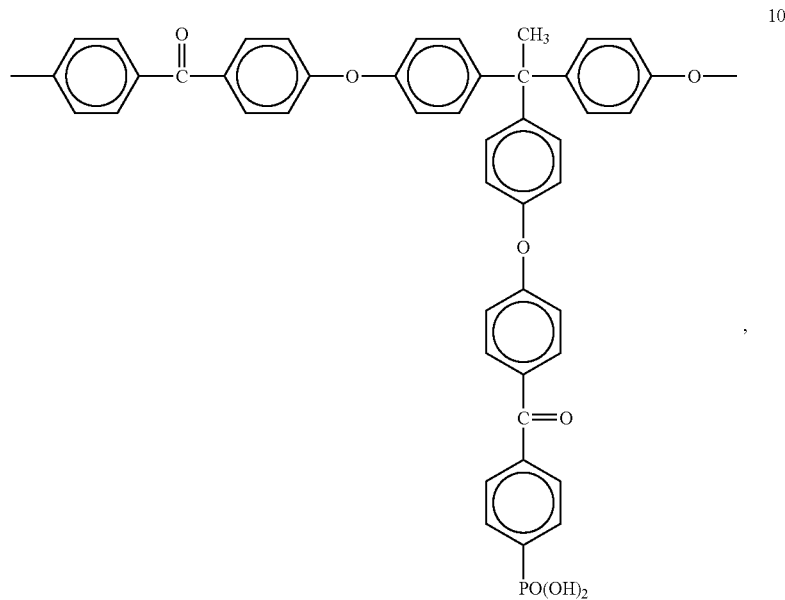
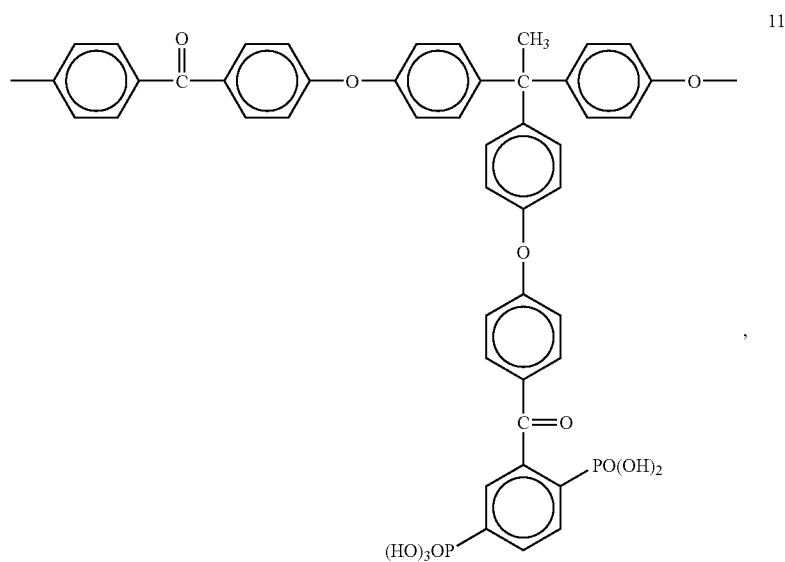

-continued

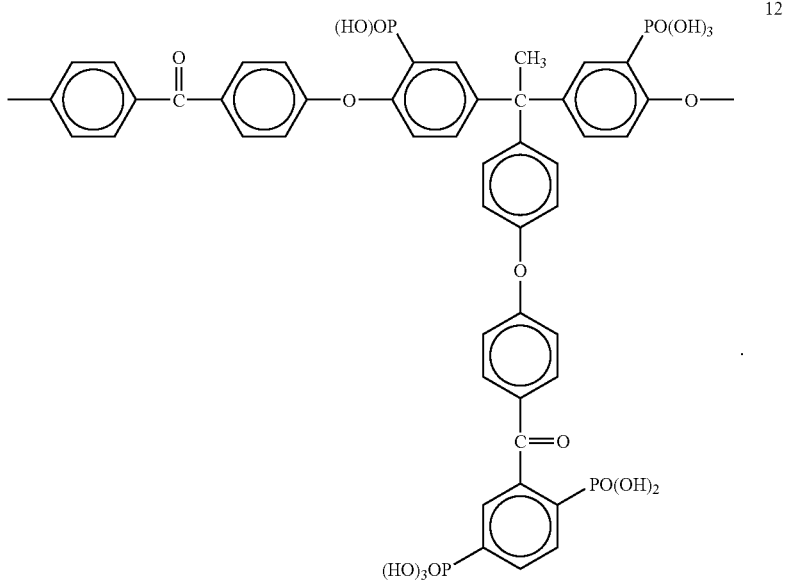
12

9. The block copolymer of claim 1 wherein A is described by formula 4:

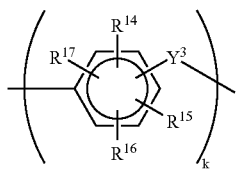
4

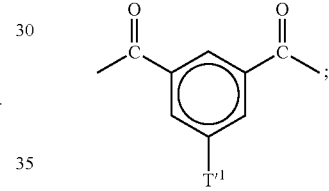
30 wherein:

Y$^3$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next aromatic ring, or R$^4$ is H, C$_1$-10 alkyl, C$_{6-18}$ aryl, or C$_{6-18}$ aralkyl;

R$^{14}$, R$^{15}$, R$^{16}$, and R$^{17}$ are each independently H, C$_{1-18}$ alkyl, C$_{6-18}$ aryl, or C$_{6-18}$ aralkyl;

k is an integer from 1 to 6;

with the proviso that when k>1, the Y$^3$ between sequential aromatic rings are the same or different, and the R$^{14}$, R$^{15}$, R$^{16}$, and R$^{17}$ on sequential aromatic rings are the same or different.

10. The block co-polymer of claim 9 wherein A comprises a component selected from the group consisting of polymer segments having formulae 13 to 16; and salts thereof:

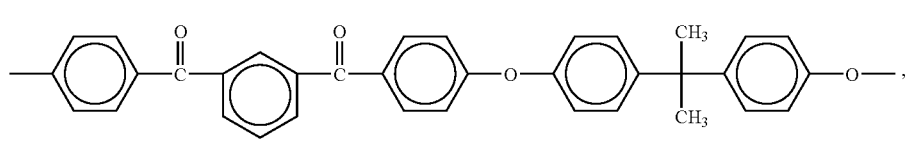
13

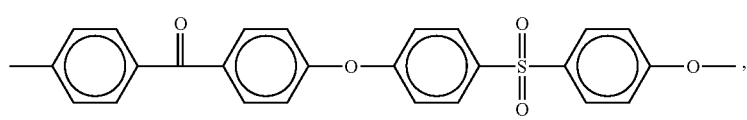
14

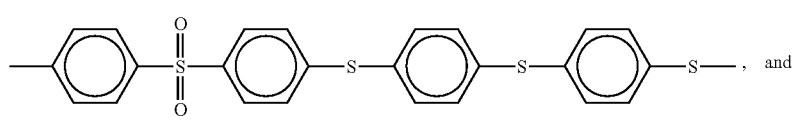
15

-continued

*(Structure 16: a diphenyl ketone-benzene-ketone-phenyl-O-phenyl-C(CF$_3$)$_2$-phenyl-O- structure)*

11. An ion conductive membrane made from the block copolymer of claim 9.

12. The ion conductive membrane of claim 11 made by a method comprising:
   a) synthesizing an end-functionalized first polymer block having formula 18:

*(Structure 18)* wherein $Z^1$ and $Z^2$ are each independently —H, —SH, —S(O)N($R^{18}$)$_2$, F, Cl, Br, I, —NO$_2$, or —OH; and
   $R^{18}$ is H, C$_{1-10}$ alkyl, cycloalkyl, C$_{6-18}$ aryl, or C$_{1-18}$ aralkyl;
   b) synthesizing an end functionalized second polymer block having formula 19:

*(Structure 19)* wherein $Z_3$ and $Z_4$ are each independently H, —SH, —S(O)N($R^{18}$)$_2$, F, Cl, Br, I, —NO$_2$, or —OH; and
   c) reacting the products of steps a) and b) to form the block copolymer.

13. The ion conductive membrane of claim 11 made by a method comprising:
   a) synthesizing an end-functionalized polymer block having formula 19:

*(Structure 19)* wherein $Z^1$ and $Z^2$ are each independently —H, —SH, —S(O)N($R^{18}$)$_2$, F, Cl, Br, I, —NO$_2$, or —OH; and
   $R^{18}$ is H, C$_{1-10}$ alkyl, cycloalkyl, C$_{6-18}$ aryl, or C$_{1-18}$ aralkyl;
   b) reacting the polymer block having formula 19 with one or more monomers that polymerize into a block having formula 2:

*(Structure 2)* to form the block copolymer having formula 1.

14. The ion conductive membrane of claim 13 wherein the method further comprises:
   a) transforming the acid groups of the block copolymer to acid halide groups to form a modified block copolymer,
   b) casting a film from a solution of the modified block copolymer of step a) onto a substrate; and
   c) transforming the acid halide groups into the acid groups to form the ion conductive membrane.

15. The ion conductive membrane of claim 11 made by a method comprising:
   a) synthesizing an end-functionalized polymer block having formula 18:

*(Structure 18)* wherein $Z^1$ and $Z^2$ are each independently —H, —SH, —S(O)N($R^{18}$)$_2$, F, Cl, Br, I, —NO$_2$, or —OH; and
   $R^{18}$ is H, C$_{1-10}$ alkyl, cycloalkyl, C$_{6-18}$ aryl, or C$_{6-18}$ aralkyl;
   b) reacting the polymer block having formula 18 with one or more monomers that polymerize into a block having formula 4:

*(Structure 4)* to form the block copolymer having formula 1.

16. A block copolymer for use as a solid polymer electrolyte, the block copolymer comprising a polymer having formula 1:

$$(A_m B_n)_p \quad 1$$

wherein A is a first polymer segment described by formula 4:

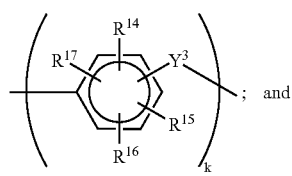

B is a second polymer segment described by formula 2:

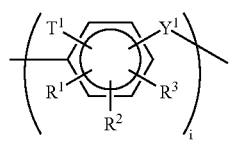

$Y^1$ and $Y^3$ each independently —O—, —S—, —CO—, —SO$_2$—, —C(CF$_3$)$_2$—, —P(O)(T$^{1}$)—, —C(CH$_3$)(T$^{1}$)—, —P(O)(R$^4$)—, diphenyl methylene, diphenyl silicon, fluorenyl, an alkylene, a bond directly to the next aromatic ring, or

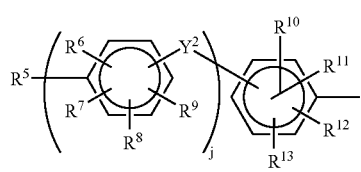

$R^1$, $R^2$, and $R^3$ are each independently H, $C_{1-10}$ alkyl, $C_{6-18}$ aryl, $C_{6-18}$ aralkyl, —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

$R^4$ is H, $C_{1-10}$ alkyl, $C_{6-18}$ aryl, or $C_{6-18}$ aralkyl;

M is a metal, ammonium, or alkylammonium;

$R^{14}$, $R^{15}$, $R^{16}$, and $R^{17}$ are each independently H, $C_{1-18}$ alkyl, $C_{6-18}$ aryl, or $C_{6-18}$ aralkyl;

T$^{1}$ is H or a moiety having at least one substituent for proton transfer:

m, n are each independently an integer from 1 to 200; and
p is an integer from 1 to 20;
i is an integer from 1 to 6;
k is an integer from 1 to 6;
T$^{1}$ is given by formula 3:

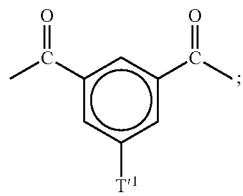

$Y^2$ is —O—, —S—, —CO—, —SO$_2$—, —C(CH$_3$)$_2$—, —C(CF$_3$)$_2$—, —P(O)(R$^4$)—, diphenyl methylene, diphenyl silicon, fluorenyl, an alkylene, or a bond directly to the next aromatic ring;

$R^4$ is H, $C_{1-10}$ alkyl, $C_{6-18}$ aryl, or $C_{6-18}$ aralkyl;
$R^5$, $R^6$, $R^7$, $R^8$, $R^9$, $R^{10}$, $R^{11}$, $R^{12}$, and $R^{13}$ are each independently H, $C_{1-10}$ alkyl, $C_{6-18}$ aryl, $C_{6-18}$ aralkyl, —SO$_3$H, —SO$_3^-$M$^+$, —COOH, —COO$^-$M+, —PO$_3$H$_2$, —PO$_3$H$^-$M$^+$, —PO$_3^{2-}$M$_2^+$, or —PO$_3^{2-}$M$^{2+}$;

M is a metal, ammonium, or alkylammonium; and
j is an integer from 1 to 30,
with the proviso that when j>1, the $Y^2$ between sequential aromatic rings are the same or different and the $R^5$, $R^6$, $R^7$, $R^8$, and $R^9$ on sequential aromatic rings are the same or different; wherein at least one of $R^5$, $R^6$, $R^7$, $R^8$, $R^9$, $R^{10}$, $R^{11}$, $R^{12}$, and $R^{13}$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$;

with the proviso that when i>1, the $Y^1$ between sequential aromatic rings are the same or different; the T$^1$ on sequential aromatic rings are the same or different and $R^1$, $R^2$, and $R^3$ on sequential aromatic rings are the same or different; and when k>1, the $Y^3$ between sequential aromatic rings are the same or different and the $R^{14}$, $R^{15}$, $R^{16}$, and $R^{17}$ on sequential aromatic rings are the same or different; wherein for at least one aromatic ring in formula 2, either T$^1$ is not H or one of $R^1$, $R^2$, and $R^3$ is —SO$_3$H, —SO$_3^-$M$^+$, —COOH, —COO$^-$M$^+$, —PO$_3$H$_2$, —PO$_3$H$^-$M$^+$, —PO$_3^{2-}$M$_2^+$, or —PO$_3^{2-}$M$^{2+}$.

17. The block copolymer of claim 16 wherein $R^1$, $R^2$, and $R^3$ are each independently H, —PO$_3$H$_2$, —PO$_3$H$^-$M$^+$, —PO$_3^{2-}$M$_2^+$, or —PO$_3^{2-}$M$^{2+}$; and T$^1$ is H.

18. The block copolymer of claim 16 wherein $R^1$, $R^2$, and $R^3$ are each independently H, —PO$_3$H$_2$, —PO$_3$H$^-$M$^+$, —PO$_3^{2-}$M$_2^+$, or —PO$_3^{2-}$M$^{2+}$; and T$^1$ is H.

19. An ion conductive membrane made from the block copolymer of claim 16.

20. A block copolymer having formula 1:

$(A_mB_n)_p$                                 1 wherein:
A is first polymer segment;
B is a second polymer segment described by formula 17:

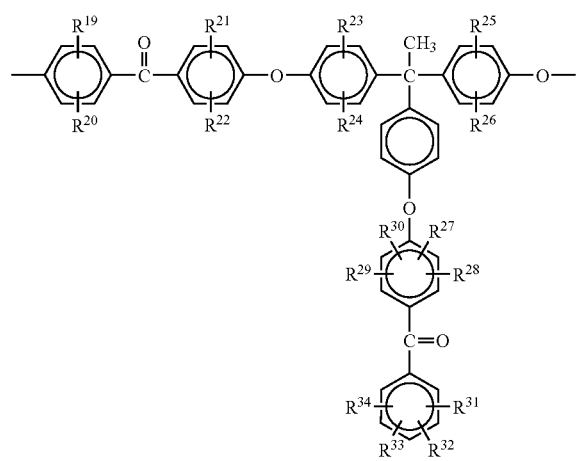

wherein:
m, n are each independently an integer from 1 to 200; and
p is an integer from 1 to 20;
$R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, and $R^{34}$ are each independently H, —SO$_3$H, —SO$_3^-$M$^+$, —COOH, —COO$^-$M+, —PO$_3$H$_2$, —PO$_3$H$^-$M$^+$, —PO$_3^{2-}$M$_2^+$, or —PO$_3^{2-}$M$^{2+}$;

M is a metal, ammonium, or alkylammonium; and
B is a second polymer segment.

21. The block copolymer of claim 20 wherein A is described by formula 4:

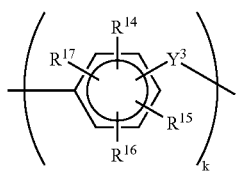

wherein:
Y$^3$ is —O—, —S—, —CO—, —SO$_2$—, —C(CH$_3$)$_2$—, —C(CF$_3$)$_2$—, —P(O)(T$^1$)—, —C(CH$_3$)(T$^1$)—, —P(O)(R$^4$)—, diphenyl methylene, diphenyl silicon, fluorenyl, an alkylene, a bond directly to the next aromatic ring, or

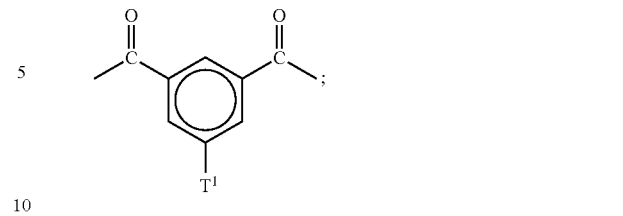

R$^4$ is H, C$_{1-10}$ alkyl, C$_{6-18}$ aryl, or C$_{6-18}$ aralkyl;
R$^{14}$, R$^{15}$, R$^{16}$, and R$^{17}$ are each independently H, C$_{1-18}$ alkyl, C$_{6-18}$ aryl, or C$_{6-18}$ aralkyl;
k is an integer from 1 to 4;
with the proviso that when k>1, the Y$^3$ between sequential aromatic rings are the same or different and the R$^{14}$, R$^{15}$, R$^{16}$, and R$^{17}$ on sequential aromatic rings are the same or different.

* * * * *